US011321900B2

(12) United States Patent
Hagland

(10) Patent No.: US 11,321,900 B2
(45) Date of Patent: May 3, 2022

(54) SYSTEMS AND METHODS FOR ADJUSTING ONE OR MORE PARAMETERS OF A GPU

(71) Applicant: Sony Interactive Entertainment Inc., Tokyo (JP)

(72) Inventor: Torgeir Hagland, Santa Ana, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/693,173

(22) Filed: Nov. 22, 2019

(65) Prior Publication Data

US 2021/0158597 A1    May 27, 2021

(51) Int. Cl.
*G06F 13/16* (2006.01)
*G06T 13/00* (2011.01)
*G06T 15/00* (2011.01)
*A63F 13/50* (2014.01)
*G06T 3/40* (2006.01)
*G06T 15/06* (2011.01)

(52) U.S. Cl.
CPC ............ *G06T 15/005* (2013.01); *A63F 13/50* (2014.09); *G06T 3/40* (2013.01); *G06T 15/06* (2013.01); *G06F 13/161* (2013.01); *G06F 2212/1024* (2013.01); *G06F 2212/1028* (2013.01); *G06T 13/00* (2013.01); *G06T 2200/16* (2013.01); *G06T 2210/08* (2013.01); *G06T 2210/36* (2013.01)

(58) Field of Classification Search
CPC ..... G06F 2212/1024; G06F 2212/1028; G06F 13/161; G06T 13/00
See application file for complete search history.

(56) References Cited

U.S. PATENT DOCUMENTS

| | | | |
|---|---|---|---|
| 2009/0118017 A1* | 5/2009 | Perlman | H04N 21/233 463/42 |
| 2015/0177822 A1* | 6/2015 | Shoshan | G06T 1/20 345/522 |
| 2017/0132830 A1* | 5/2017 | Ha | G06T 15/55 |
| 2020/0202612 A1* | 6/2020 | Yang | G06T 11/40 |

* cited by examiner

*Primary Examiner* — Matthew Salvucci
(74) *Attorney, Agent, or Firm* — Penilla IP, APC

(57) ABSTRACT

A method for adjusting complexity of content rendered by a graphical processing unit (GPU) is described. The method includes processing, by the GPU, an image frame for a scene of a game. The method further includes tracking one or more metrics regarding the processing of the image frame during the processing of the image frame. During the processing of the image frame, the method includes sending a quality adjuster signal (QAS) to a shader associated with a game engine. The QAS is generated based on the one or more metrics associated with the processing by the GPU. During the processing of the image frame, the method includes adjusting, by the shader, one or more shader parameters upon receipt of the QAS, wherein said adjusting the one or more shader parameters changes a level of complexity of the image frame being processed by the GPU.

21 Claims, 13 Drawing Sheets

(Parameter value change based on how busy GPU A is)

(Parameter value change based on latency)

(Parameter value change based on power consumption)

(Parameter value change based on GPU temp.)

(Parameter value change based on latency of user input)

| Parameter P | Value |
|---|---|
| Resolution (R) | R1, R2, R3,... |
| Ray Iteration Count (RIC) (how many times color of a pixel is calculated) | RIC1, RIC2, RIC3,.. |
| No. of virtual objects rendered (VOR) | VOR1, VOR2, VOR3,... |
| Prioritizing virtual objects to be rendered (PRTY) | PRTY1, PRTY2, PRTY3... |
| Quality parameter (QP) | W1R + W2(RIC) + W3(VOR) + W4(PRTY)<br><br>QP1, QP2, QP3,... |

No. of pixels or how many pixels share the same color

No. of times ray tracing is performed

FIG. 6A

SYSTEMS AND METHODS FOR ADJUSTING ONE OR MORE PARAMETERS OF A GPU

FIELD

The present disclosure relates to systems and methods for adjusting one or more parameters of a graphical processing unit (GPU).

BACKGROUND

Many of today's games and simulations facilitate multiple players simultaneously participating in the same instance of a game. The multiplayer aspect of such games provides an enriched gaming experience, where players may communicate, collaborate, compete against one another, and/or otherwise interact with and affect each other and their shared collective gaming environment. The players in a multiplayer game are connected via a network, such as a local area network (LAN) or a wide area network (WAN).

The multiplayer gaming has created a need to accommodate a large number of players in a networked multiplayer game, while maintaining a quality gaming experience for each player.

SUMMARY

Embodiments of the present disclosure provide systems and methods for adjusting one or more parameters of a graphical processing unit (GPU).

Other aspects of the present disclosure will become apparent from the following detailed description, taken in conjunction with the accompanying drawings, illustrating by way of example the principles of embodiments described in the present disclosure.

In an embodiment, the one or more parameters of the GPU are adjusted during an operation of rendering an image frame. For example, details of the image frame are reduced during the rendering instead of after rendering the image frame.

In one embodiment, the systems and methods described herein provide a shader data parameter, including a quality parameter. A shader chooses a value of the shader data parameter during execution of the shader. For example, a ray iteration count or a level of detail of a virtual object, such as virtual grass or virtual foliage, is modified by the shader based on how busy a graphical processing unit (GPU) is. The GPU executes the shader. As another example, the level of detail is determined based on a distance of the virtual object in a virtual scene. To illustrate, when the virtual object is far away, along a depth dimension, in the virtual scene, the level of detail is less compared to when the virtual object is closer in the depth dimension. A quality parameter matrix having multiple values of multiple shader data parameters is generated, and the values are applied during a rendering operation performed by execution of the shader by the GPU.

In an embodiment, a method for adjusting complexity of content rendered by the GPU is described. The method includes processing, by the GPU, an image frame for a scene of a game. The method further includes tracking one or more metrics regarding the processing of the image frame during the processing of the image frame. During the processing of the image frame, the method includes sending a quality adjuster signal (QAS) to a shader associated with a game engine. The QAS is generated based on the one or more metrics associated with the processing by the GPU. During the processing of the image frame, the method includes adjusting, by the shader, one or more shader parameters upon receipt of the QAS, wherein said adjusting the one or more shader parameters changes a level of complexity of the image frame being processed by the GPU.

In an embodiment, a server for adjusting complexity of content rendered by the GPU is described. The GPU executes a shader to process an image frame for a scene of a game. The GPU tracks one or more metrics regarding the processing of the image frame. The server includes a processing unit coupled to the GPU. The processing unit generates and sends the QAS to the shader associated with the game engine. The QAS is sent to the shader while the image frame is being processed and is generated based on the one or more metrics associated with the processing by the GPU. The shader adjusts one or more shader parameters upon receipt of the QAS. The adjustment of the one or more shader parameters occurs while the image frame is being processed and the adjustment of the one or more shader parameters changes a level of complexity of the image frame being processed by the GPU.

In one embodiment, a system for adjusting complexity of content rendered by the GPU is described. The system includes a server node. The server node includes the GPU. The GPU processes an image frame for a scene of a game. The GPU tracks one or more metrics regarding the processing of the image frame. The GPU executes the shader. The server node further includes a processing unit coupled to the GPU. The processing unit generates and sends the QAS to the shader associated with the game engine. The QAS is sent to the shader while the image frame is being processed. The QAS is generated based on the one or more metrics associated with the processing by the GPU. The shader adjusts one or more shader parameters upon receipt of the QAS. The adjustment of the one or more shader parameters occurs while the image frame is being processed and the adjustment of the one or more shader parameters changes a level of complexity of the image frame being processed by the GPU. The system includes a client device that communicates with the server node via a computer network.

Some advantages of herein systems and methods include accounting for network latency, temperature of the GPU, power associated with the GPU, and reception of a user input during rendering of an image frame to save time in rendering the image frame. For example, if it is determined that there is an increase in the network latency during rendering of the image frame, complexity of the image frame is reduced to increase a rate at which the image frame is rendered. This increase in the rate of rendering the image frame accounts for, such as negates an effect of, the network latency. As another example, upon determining that the power associated with the GPU, or the temperature of the GPU, or both are high, the complexity during rendering of the image frame is reduced. The reduction in the complexity reduces the temperature of the GPU and the power associated with the GPU. The reduction in the power also reduces the temperature of the GPU.

Also, accounting for the temperature of the GPU and the power associated with the GPU increases a life cycle of the GPU. Increasing or maintaining a load of the GPU when the GPU is consuming a high amount of power or when the temperature of the GPU is high reduces the life cycle. By reducing the complexity, the temperature of the GPU and the power associated with the GPU are reduced to increase the life cycle of the GPU.

BRIEF DESCRIPTION OF THE DRAWINGS

Various embodiments of the present disclosure are best understood by reference to the following description taken in conjunction with the accompanying drawings in which:

FIG. 6A is a diagram of an embodiment of a table to illustrate examples of the parameters.

DETAILED DESCRIPTION

Systems and methods for adjusting one or more parameters of a graphical processing unit (GPU) are described. It should be noted that various embodiments of the present disclosure are practiced without some or all of these specific details. In other instances, well known process operations have not been described in detail in order not to unnecessarily obscure various embodiments of the present disclosure.

Figure 1:
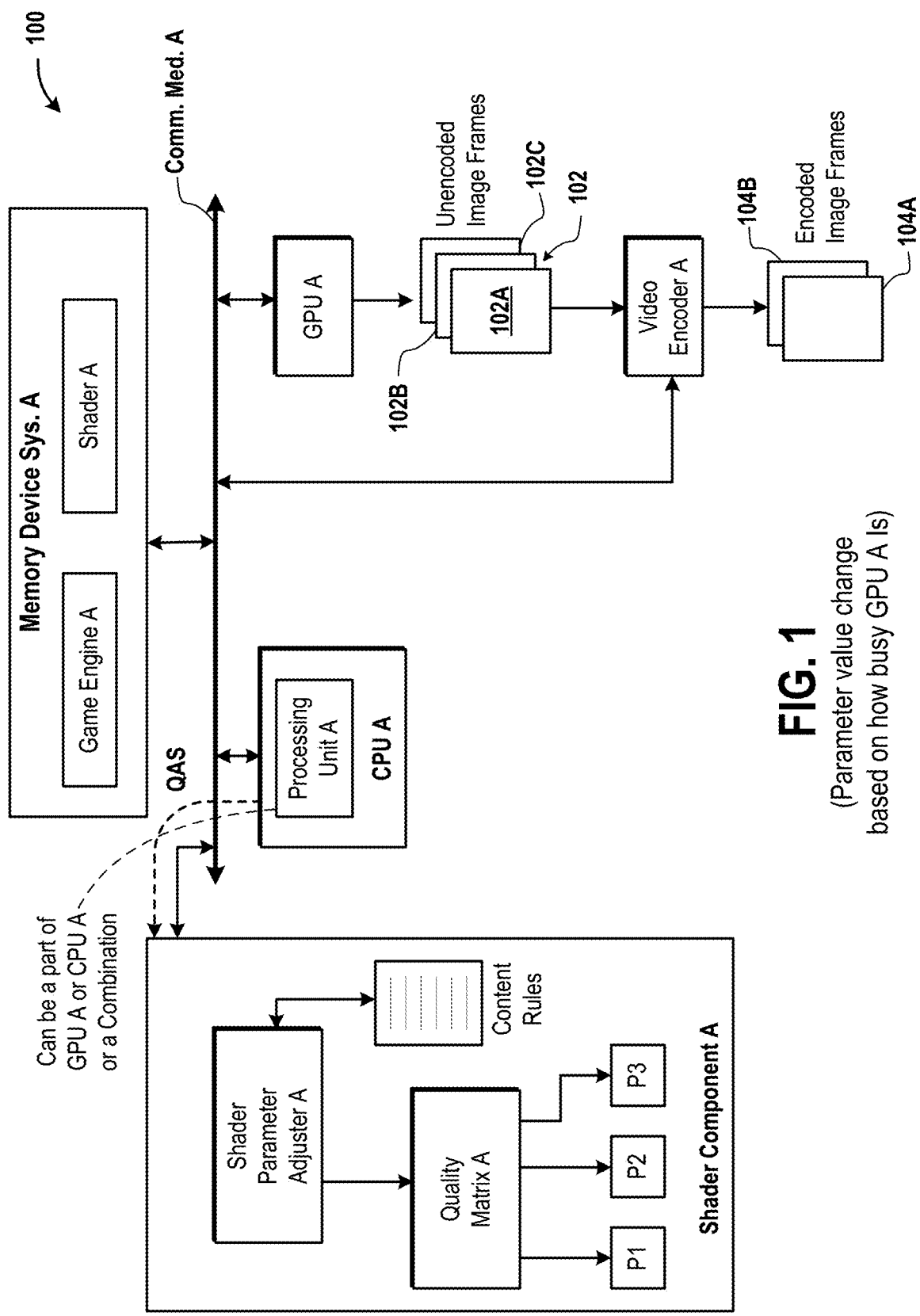
FIG. 1 is a diagram of an embodiment of a system to illustrate a change in a parameter value of a shader based on processing power usage of a graphical processing unit (GPU).

FIG. 1 is a diagram of an embodiment of a system 100 to illustrate a change in a parameter value of a shader A based on processing power usage of a GPU A. The system 100 includes a memory device system A, a central processing unit (CPU) A, the GPU A, a video encoder A, and a shader component A. Examples of a memory device system, as described herein, include one or more memory devices that are coupled to each other. To illustrate, a memory device is a device from which data is read or to which the data is written. The memory device can be a read-only memory (ROM) device, or a random access memory (RAM) device, or a combination thereof. To further illustrate, the memory device includes a flash memory, a cache, or a redundant array of independent disks (RAID). As an example, a CPU, as used herein, is an electronic circuit that carries out or executes multiple instructions of a computer program, such as a game engine, by performing arithmetic, logic, control, and input/output (I/O) functions that are specified by the instructions. To further illustrate, the CPU executes instructions to determine variables, such as, a position, an orientation, a size, and a location of a virtual object in a virtual scene of a game. Examples of the CPU include a processor, a microprocessor, a microcontroller, an application specific integrated circuit (ASIC), and a programmable logic device (PLD), and these terms are used herein interchangeably. Examples of the virtual object, as used herein, include a virtual gun, a virtual user, a virtual weapon, a virtual vehicle, a virtual sport equipment, a virtual background object, and one or more virtual blades of grass. The virtual background object is sometimes referred to herein as game content context. Examples of the game content context include the virtual object, such as, the virtual blades of grass and a virtual bush. Sometimes, the term game content context and game content are used herein interchangeably. An example of a GPU, as used herein, includes an electronic circuit, such as a processor or an ASIC or a PLD or a microcontroller, that applies a rendering program to generate image frames for output to a display device for display of images on the display device.

Examples of a video encoder, as used herein, include a compressor that compresses multiple image frames to output one or more encoded image frames. To illustrate, the video encoder receives raw image frames to output I, P, and B frames. As another illustration, the video encoder applies an H.264 standard to compress multiple image frames. An example of an image frame is a still image. A rate at which the multiple image frames, such as multiple images, are being rendered is sometimes referred to herein at a frame rate. As an example, a frame rate is measured as number of image frames rendered per second or a number of image frames per second (fps).

The memory device system A, the CPU A, the GPU A, and the video encoder A are coupled to each other via a communication medium A. To illustrate, the shader component A, the memory device system A, the CPU A, the GPU A, and the video encoder A are components of a system-on-chip (SoC). As another illustration, the shader component A, the memory device system A, the CPU A, the GPU A, and the video encoder A are components of a node, such as a server or a game console, of a server system. Examples of a communication medium, as used herein, include a wired or wireless communication medium. Examples of the wired communication medium include a bus, a cable, and silicon. Examples of the wireless communication medium include a medium for transferring data via a wireless transfer protocol, such as Bluetooth™ or Wi-Fi™.

Examples of a shader component, as used herein, include a processor, or an ASIC, or a PLD, or a controller, or a computer program, or a portion of a computer program. As an example, the shader component A is located outside the GPU A and is coupled via the communication medium A to the GPU A. As another example, the shader component A is a part of the GPU A. to further illustrate, the shader component A is a component within the GPU A or is a portion of a computer program that is executed by the GPU A. As another example, the shader component A is a component or a portion of the shader A.

The memory device system A stores a game engine A and a shader A. Examples of a game engine, as described herein, include a game computer program, a computer program for generating a virtual reality (VR) scene, a computer program for generating an augmented reality (AR) scene, a physics software program for applying laws of physics for generating the VR scene or the AR scene, or a rendering computer program for applying a rendering operation for generating the VR scene or the AR scene, or a combination of two or more thereof. To illustrate, the laws of physics are applied for collision detection or collision response. Examples of the virtual scene include the VR scene and the AR scene. As an example, the virtual scene includes one or more virtual objects and one or more virtual backgrounds. To illustrate, the virtual scene includes multiple virtual users, multiple virtual trees, multiple virtual weapons held by the virtual users, a virtual sky, and a virtual plane of a video game.

Examples of a shader, as used herein, include a computer program used for rendering multiple raw image frames. To illustrate, the shader is executed by a GPU to produce designated levels of intensity, texture, or color, or a combination of two or more thereof, for all pixels within an image frame. As another illustration, the shader A is a portion of the game engine A. It should be noted that in an embodiment, the terms intensity, brightness, and shade are used herein interchangeably. A texture, in one embodiment, of pixels of an image frame is an arrangement of color or intensities in the image frame.

The shader component A includes a shader parameter adjuster A and a quality matrix A. As an example, a shader parameter adjuster, as used herein, of a shader component is a portion of a computer program of the shader component. As another example, the shader parameter adjuster, of the shader component is a part of a processor, an ASIC, or an PLD that implements the shader component. As another example, the shader component A is a part of a computer program of the shader A.

A quality matrix, as used herein, is a matrix that includes multiple values of one or more parameters, such as P1, P2, and P3. An example of the parameter P1 is an amount of detail within an image frame. To illustrate, an amount of detail within the image frame is less when the virtual object is represented by a first number of pixels, such as forty or fifty, within the image frame. The amount of detail is less compared to another amount of detail within the same image frame when the virtual object is represented by a second number of pixels, such as 100 or 200 pixels. The first number of pixels is less than the second number of pixels. Both the first and second number of pixels occupies the same amount of display area on a display screen of a client device. As another illustration, an amount of detail within the image frame that has 10 blades of grass within the image frame is less than another amount of detail within the image frame provided to 20 blades of grass. The 20 blades of grass occupy a larger number of pixels of the image frame than the 10 blades of grass but occupy the same amount of display area on a display screen of a client device as that occupied by the 10 blades of grass. A display area, of a display screen, is measured as a product of a width of the display area and a length of the display area. An example of the parameter P2 is a distance at which the virtual object is represented within the virtual scene of an image frame. To illustrate, the parameter P2 is a distance, in a depth dimension, at which the virtual object is represented in the virtual scene of the image frame. An example of the parameter P3 is a number of ray iterations that are performed during the rendering operation to render at least a portion of an image frame. The portion includes the virtual object being rendered. Ray iteration is sometimes referred to herein as ray tracing. During each ray iteration, a color and intensity of a pixel within an image frame is calculated by the shader component A. For multiple ray iterations, the color and intensity of the pixel within the image frame is calculated multiple times. The rendering operation is performed by the GPU A to process, such as generate or output, one or more image frames, which are further described below.

The CPU A includes a processing unit A. A processing unit, as used herein, includes a processor, or an ASIC, or a PLD, or a controller. To illustrate, a processing unit within a CPU is a part of a PLD or an ASIC or a controller that executes functions described herein as being performed by the processing unit.

During a play of a game, the CPU A executes the game engine A to determine variables, such as a shape, a size, a position, and an orientation, of a model of the virtual object for an image frame having the virtual scene. The CPU A sends an indication of completion of the determination of the variables via the communication medium A to the GPU A. Upon receiving the indication of the completion, the GPU A executes the rendering operation to determine a color and shade for each pixel of the image frame.

During a time period in which the GPU A executes the rendering operation for generating, such as rendering, the image frame, the processing unit A determines how busy the GPU A is. For example, once the GPU A starts execution of the rendering operation, the GPU A sends a signal to the processing unit A. Upon receiving the signal, the processing unit A determines that the rendering operation has started and starts to determine how busy the GPU A is.

As an example, to determine how busy the GPU A is, the processing unit A sends a request to the GPU A to obtain a frame rate of generation of image frames, such as image frames 102A, 102B, and 102C, by the GPU A. The image frames 102A-102C are unencoded image frames, such as raw image frames, for the game. The request is sent via the communication medium A to the GPU A. The GPU A upon receiving the request, provides the frame rate via the communication medium A to the CPU A. The processing unit A determines that the frame rate is greater than a predetermined frame rate to further determine that the GPU A is busy. As an illustration, the GPU A is busy generating image frames for multiple games. As another illustration, the GPU A is busy generating the image frames 102A-102C for the game. Continuing with the example, when the GPU A is busy, the GPU A is using a large amount of processing power, e.g., greater than a predetermined amount, of the GPU A. The predetermined amount of power is an example of a predetermined power threshold level. On the other hand, the processing unit A determines that the frame rate is less than the predetermined frame rate to further determine that the GPU A is not busy. When the GPU A is not busy, the GPU A is using a small amount of processing power, e.g., less than the predetermined amount of power, of the GPU A. An amount of processing power of the GPU A is an example of power consumed by the GPU A.

Upon determining that the GPU A is busy, the processing unit A generates and sends a quality adjuster signal (QAS) via the communication medium A to the shader parameter adjuster A. The QAS signal is sent from the processing unit A to the shader component A while the GPU A is processing, such as rendering or generating, the image frames 102A-102C. For example, during a time period in which the image frame 102A is being rendered, the processing unit A sends the QAS signal to the shader component A.

Upon receiving the QAS, the shader parameter adjuster A applies content rules to adjust values of one or more of the parameters P1-P3 of one or more of the image frames 102A-102C being generated by the GPU A. For example, the shader parameter adjuster A reduces a resolution, such as an amount of detail, of the virtual object in the image frame 102A, or increases a distance, in the depth dimension, of the virtual object within the image frame 102A so that a lower number of pixels of the virtual object occupies the image frame 102A, or decreases a number of ray iterations that are used to generate the color and intensity of pixels representing the virtual object in the image frame 102A, or a combination thereof. It should be noted that when the resolution of the virtual object in the image frame 102A is decreased, a resolution of the image frame 102A decreases. As another example, the shader parameter adjuster A reduces an amount of detail of the virtual object in the image frame 102A to a preset level of detail, or increases a distance, in the depth dimension, of the virtual object within the image frame 102A to a preset distance, or decreases a number of ray iterations that are used to generate the color and intensity of pixels representing the virtual object in the image frame 102A to a preset number of ray iterations, or a combination thereof. The preset level of detail, the preset distance, and the preset number of ray iterations are stored in the memory device system A.

As yet another example, the shader parameter adjuster A reduces an amount of detail of the virtual object in the image frames 102A-102C having the virtual object, or increases a distance, in the depth dimension, of the virtual object within the image frames, or decreases a number of ray iterations that are used to generate the color and intensity of pixels representing the virtual object in the image frames 102A-102C, or a combination thereof. As still another example, the shader parameter adjuster A reduces an amount of detail of the virtual object in the image frames 102A-102C having the virtual object to the preset level of detail, or increases a distance, in the depth dimension, of the virtual object within the image frames 102A-102C to the preset distance, or decreases a number of ray iterations that are used to generate the color and intensity of pixels representing the virtual object in the image frames to the preset number of ray iterations, or a combination thereof. As yet another example, the shader parameter adjuster A adjusts the values of one or more of the parameters P1-P3 while a portion, such as pixels or blocks, of the image frame 102A is generated and remaining portion, such as remaining pixels or remaining blocks, of the image frame 102A is not generated. The shader parameter adjuster A provides the adjusted values of one or more of the parameters P1-P3 to the shader A via the communication medium A.

Upon receiving the adjusted values of one or more of the parameters P1-P3, the shader A outputs the image frames, such as the image frames 102A-102C, having the adjusted values of the parameters P1-P3. It should be noted that the one or more parameters are adjusted before completion of generation of the image frames 102A-102C. The image frames 102A-102C are unencoded image frames. The shader A sends image frames 102A-102C to the video encoder A via the communication medium A. The video encoder A encodes, such as compresses, the image frames 102A-102C to output encoded image frames, such as encoded image frames 104A and 104B. On the other hand, upon determining that the GPU A is not busy, the processing unit A does not generate the QAS and none of the parameters P1-P3 are adjusted by the shader parameter adjuster A.

In one embodiment, the values of the parameters P1-P3 are not adjusted by the shader parameter adjuster A before the image frames 102A-102C are rendered, such as generated or produced or output. For example, the CPU A does not send an instruction to the GPU A to adjust values of the parameters P1-P3 before the rendering operation is performed by the GPU A for generation of the image frames 102A-102C.

In one embodiment, the values of the parameters P1-P3 are not adjusted by the shader parameter adjuster A after the image frames 102A-102C are rendered. For example, the shader parameter adjuster A does not adjust values of the image frame 102A after the image frame 102A is rendered to re-render the image frame 102A.

In one embodiment, a shader, as described herein, is a portion of a game engine. For example, the shader A is a portion of the game engine A.

In an embodiment, the functions described herein as being performed by a processing unit, such as the processing unit A, are performed by a shader component, such as the shader component A.

In one embodiment, the functions described herein as being performed by a CPU are not performed by a processing unit with the CPU but are performed by another processor, such as a main processing unit, of the CPU.

In an embodiment, the GPU A includes a frame rate counter that counts a number of images being generated by the GPU A during a predetermined time period, such as every second or every two seconds.

In one embodiment, the shader parameter adjuster A applies the content rules to determine which of multiple virtual objects in the virtual scene is more complex compared to remaining of the virtual objects. For example, the shader parameter adjuster A determines that virtual vehicle tracks in the virtual scene have a higher level of detail compared to virtual blades of grass in the virtual scene. Upon determining that the virtual vehicle tracks are more detailed, the shader parameter adjuster A reduces the level of detail of the virtual vehicle tracks without reducing a level of detail of the blades of grass. An example of the higher level of detail includes a greater number of pixels in the virtual scene of the image frame 102A than that consumed by the virtual blades of grass. Another example of the higher level of detail includes having a higher number of parts or portions or components within the image frame 102A. To illustrate, the virtual vehicle tracks have railway sleepers, railway tracks, railway fasteners, and railway ballasts and the virtual blades of grass have blades.

As another example, the shader parameter adjuster A initially reduces the level of detail of the virtual vehicle tracks and then reduces a level of detail of the blades of grass. As yet another example, the shader parameter adjuster A reduces the level of detail of the virtual vehicle tracks to less than a first predetermined level and reduces the level of detail of the virtual blades of grass to less than a second predetermined level. The first predetermined level is lower than, the same as, or greater than the second predetermined level.

Figure 2:
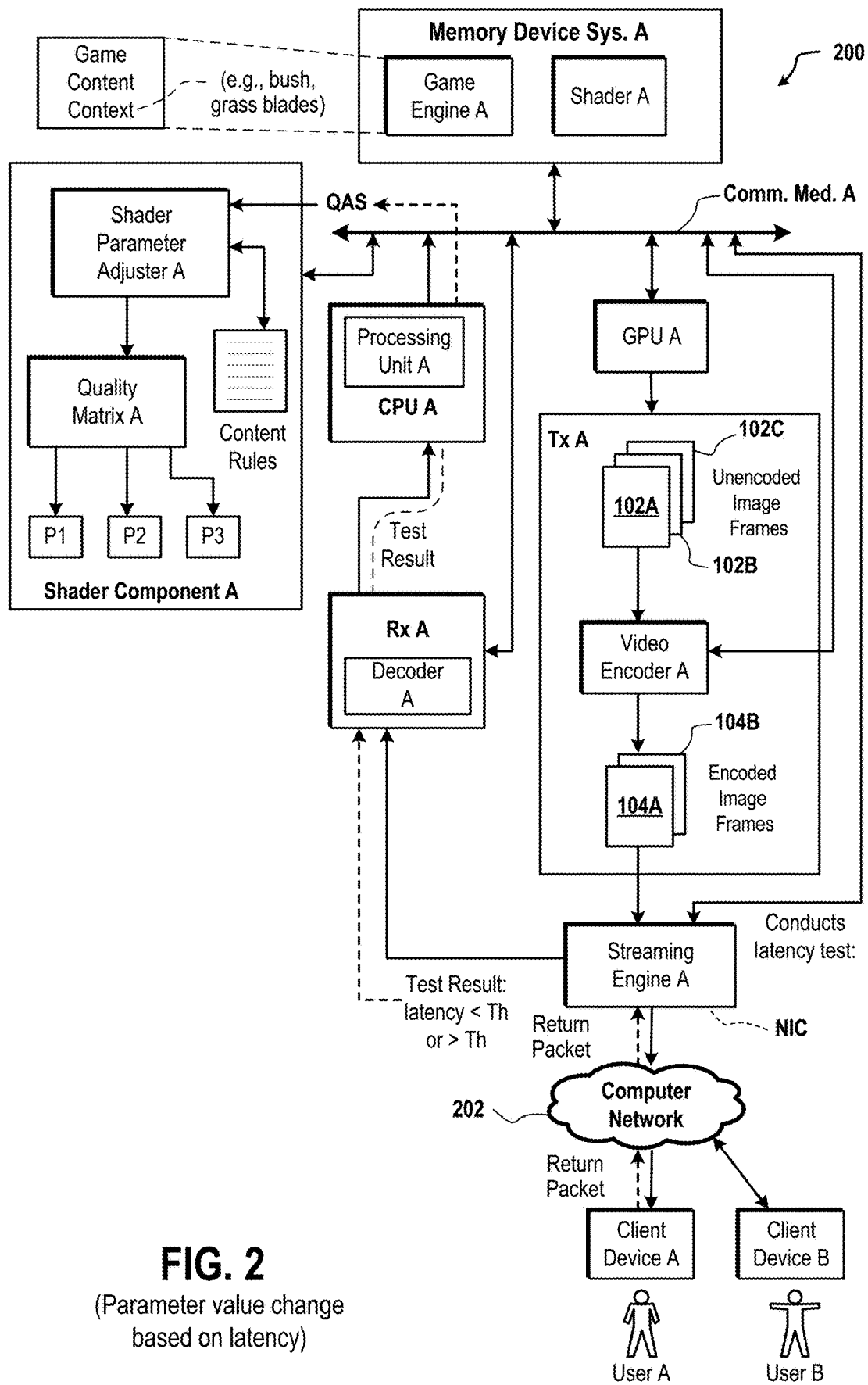
FIG. 2 is a diagram of an embodiment of a system to illustrate an adjustment of values of one or more parameters of the shader based on network latency.

FIG. 2 is a diagram of an embodiment of a system 200 to illustrate an adjustment of values of the parameters P1-P3 based on network latency. The system 200 includes the memory device system A, the communication medium A, the CPU A, the GPU A, a transmit (TX) unit A, a streaming engine A, a computer network 202, multiple client devices A and B, a receive (RX) unit A, and the shader component A. The transmit unit A includes the video encoder A and multiple frame buffers. One of the frame buffers stores the image frames 102A-102C and another one of the frame buffers stores the encoded image frames 104A and 104B. The frame buffers are coupled to the video encoder A. The receive unit A includes a decoder A and multiple frame buffers. The decoder A is coupled to the frame buffers of the receive unit A. An example of a decoder, as used herein, includes a component that is used to decode, such as decompress, encoded image frames to output unencoded image frames. To illustrate, the decoder applies the H.264 standard to convert the P, I, and B image frames into raw image frames.

Examples of a streaming engine, as used herein, include a network interface controller, such as a network interface card that applies an Internet communication protocol, such as Transmission Control Protocol/Internet Protocol (TCP/IP). The receive unit A is coupled to the communication medium A. Also, the streaming engine A is coupled to the communication medium A. Examples of the computer network 202 include a wide area network (WAN), such as the Internet, or a local area network (LAN), such as the Internet, or a combination thereof. A client device, as used herein, is a device that is operated by a user to gain access to a game that is executed using the game engine A. Examples of a client device, as used herein, include a computer, a cell phone, a tablet, a smart phone, a smart television, a game console, and a head-mounted display (HMD), etc. An HMD, as used herein, is a display device that is worn by a user to view a virtual scene, such as the VR scene or the AR scene. The VR scene or the AR scene is generated upon execution of the game engine A.

The client device A is operated by a user A and the client device B is operated by another user B. The user A is assigned a user account A by a user account server, further described below. Similarly, the user B is assigned to another user account B by the user account server. The user A logs into the user account A to access the game from one or multiple nodes, which are further described below. Similarly, the user B logs into the user account B to access the game from the one or multiple nodes.

During the rendering operation in which the frames 102A-102C are being rendered, the processing unit A sends a signal to the streaming engine A via the communication medium A to send a predetermined number of test packets, such as one or two packets, with an instruction to the client device A to send back the predetermined number of test packets to the processing unit A. When the signal is sent to the streaming engine A, the processing unit A initiates a counter or a timer to count the network latency, such as an amount of time taken for the predetermined number of packets to be sent from the streaming engine A to the client device A and to be received by the streaming engine from the client device A. For example, upon receiving the signal from the GPU A indicating that the rendering operation is being performed to generate one or more of the image frames 102A-102C, the processing unit A sends the signal to the streaming engine A to send the predetermined number of test packets with the instruction to the client device A to send back the predetermined number of test packets. Upon receiving the signal from the processing unit A, the streaming engine A generates the predetermined number of test packets and applies the Internet protocol to embed the instruction within the test packets, and sends the test packets via the computer network 202 to the client device A.

The client device A is one for which the image frames 102A-102C are being rendered. For example, in response to receiving an input signal from the client device A via the computer network 202, the CPU A determines the variables for the virtual scene. Moreover, based on the variables determined by the CPU A, the GPU A determines the color and intensity of the virtual object in the virtual scene. As another example, a request to play the game for which the virtual object is rendered by the GPU A is received from the client device A via the computer network 202.

Upon receiving the predetermined number of test packets having the instruction, the client device A parses the tests packets to obtain the instruction. The client device A applies the Internet protocol to the instruction to generate the predetermined number of return test packets, and sends the return test packets via the computer network 202 to the streaming engine A. Upon receiving the predetermined number of return test packets, the streaming engine A applies the Internet protocol to parse the return test packets to obtain the instruction. The streaming engine A sends the instruction via the receive unit A to the processing unit A. Upon receiving the instruction, the processing unit A turns off the counter or timer that was initiated to determine the network latency in transferring the predetermined number of test packets from the streaming engine A via the computer network 202 to the client device A and from the client device A by the computer network 202 to the streaming engine A. As an example, the network latency is an amount of time between the operation of sending of the predetermined number of test packets by the streaming engine A to the client device A and the operation of receipt of the predetermined number of return test packets by the streaming engine A.

The processing unit A determines whether the network latency is greater than a predetermined amount of network latency, which is stored in the memory device system A. The predetermined amount of network latency is an example of a predetermined network latency threshold level. Upon determining that the network latency is greater than the predetermined amount of network latency, such as a threshold Th, the processing unit A generates the QAS and sends the QAS via the communication medium A to the shader component A. In response to receiving the QAS, the shader parameter adjuster A, in the manner described herein, of the shader component A adjusts the values of one or more of the parameters P1, P2, and P3 and provides the adjusted values to the shader A via the communication medium A for generating the image frames 102A-102C. On the other hand upon determining that the network latency is not greater than the predetermined amount of network latency, the processing unit A does not generate the QAS.

The video encoder A receives the image frames 102A-102C output from the shader A and encodes the image frames to generate the encoded image frames 104A and 104B. The streaming engine A receives the encoded image frames 104A and 104B from the video encoder A and applies Internet protocol to the encoded image frames 104A and 104B to generate one or more packets, and transfers the one or more packets via the computer network 202 to the client device A. The client device A includes a video decoder for decoding the encoded image frames 104A and 104B to generate the image frames 102A-102C. The client device A displays the image frames 102A-102C on the display device of the client device A. Examples of the display device, as used herein, include a liquid crystal display (LCD), a light emitting diode (LED) display, and a plasma display.

Figure 3:
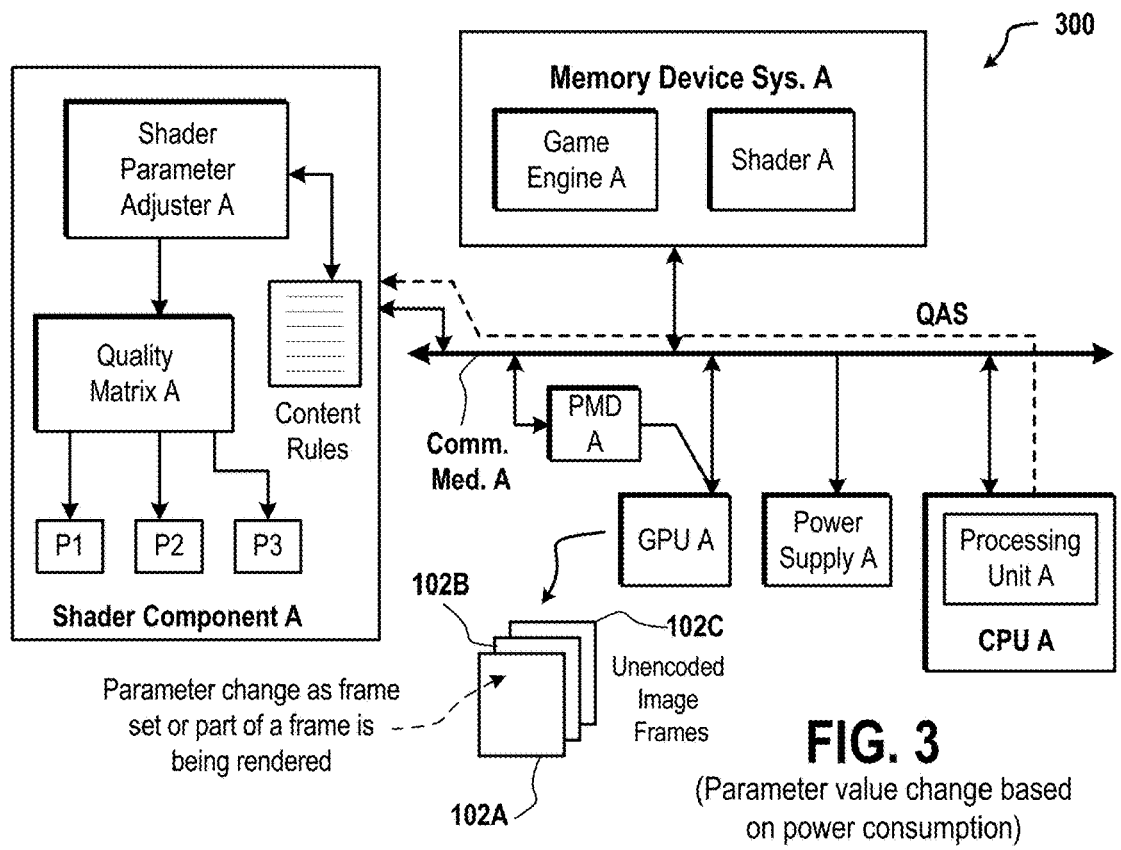
FIG. 3 is a diagram of an embodiment of a system to illustrate generation of a quality adjuster signal (QAS) for adjusting the one or more parameters based on an amount of power consumed by the GPU.

FIG. 3 is a diagram of an embodiment of a system 300 to illustrate generation of the QAS based on an amount of power consumed by the GPU A. The system 300 includes the memory device system A, the communication medium A, a power measurement device (PMD) A, the GPU A, a power supply A, the CPU A, and the shader component A. Examples of a power measurement device, as used herein, include a voltage sensor, a current sensor, or a power sensor.

The current sensor includes one or more current shunt resistors to measure current. The power supply A and the PMD A are coupled to the communication medium A. Moreover, the PMD A is coupled to an input of the GPU A to measure power at the input of the GPU A. For example, the PMD A is coupled to a power input pin of the GPU A.

During the time period in which the rendering operation is performed by the GPU A to generate one or more of the image frames 102A-102C, the PMD A measures an amount of power consumed by the GPU A at the input of the GPU A, such as power draw of the GPU A, to output power measurement data. As an example, the PMD A includes a sampler or an analog-to-digital converter (ADC) to convert analog values of the amount of power measured into digital values of the power measurement data.

The power measurement data is transferred via the communication medium A to the processing unit A. The processing unit A receives the power measurement data and determines whether the power measurement data has values that are below a predetermined power threshold, which is another example of the predetermined power threshold level. For example, while the rendering operation is being performed to generate the image frame 102A, the processing unit A determines that the power measurement data is greater than the predetermined power threshold. The predetermined power threshold is stored in the memory device system A.

Upon determining that the power measurement data is below the predetermined power threshold, the processing unit A does not generate the QAS signal. On the other hand, upon determining the power measurement data is greater than the predetermined power threshold, the processing unit A generates the QAS signal. The QAS signal is generated while or during a time period in which one or more of the frames 102A-102C are being generated by execution of the rendering operation. The processing unit A sends the QAS via the communication medium A to the shader parameter adjuster A. Upon receiving the QAS, the shader parameter adjuster A adjusts values of the one or more parameters P1-P3 of one or more of the image frames 102A-102C in the manner described herein. The adjusted values are sent from the shader parameter adjuster A via the communication medium A to the shader A to render one or more of the image frames 102A-102C having the adjusted values in the manner described herein.

In one embodiment, multiple power measurement devices are coupled to an input of the GPU A to measure power that is consumed by the GPU A.

Figure 4:
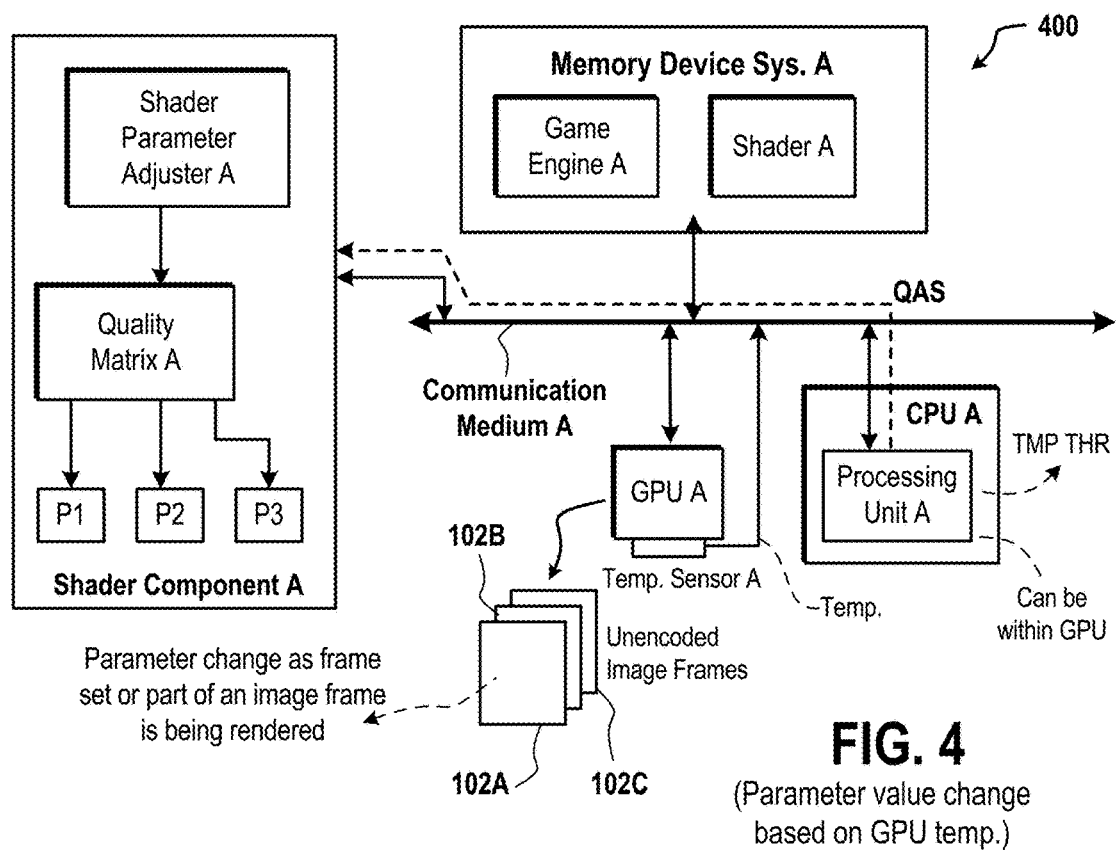
FIG. 4 is a diagram of an embodiment of a system to illustrate generation of the QAS based on a temperature of the GPU.

FIG. 4 is a diagram of an embodiment of a system 400 to illustrate generation of the QAS based on a temperature of the GPU A. The system 400 includes the memory device system A, the communication medium A, the GPU A, the CPU A, a temperature sensor A, and the shader component A. Examples of a temperature sensor, as used herein, include a thermocouple, a thermistor, a resistance temperature detector, and a semiconductor sensor. The temperature sensor A is coupled to the GPU A and to the communication medium A. For example, the temperature sensor A is attached to a surface of a semiconductor chip of the GPU A.

During generation of one or more of the frames 102A-102C by the GPU A, the temperature sensor A senses a temperature of the GPU A to output temperature data and provides the temperature data via the communication medium A to the processing unit A. As an example, the temperature sensor A includes a sampler or an ADC to convert analog temperature signals into digital data of temperature of the GPU A to provide the temperature data.

The processing unit A receives the temperature data and determines whether the temperature of the GPU A exceeds a predetermined temperature threshold TMP THR, which is stored in the memory device system A. For example, the processing unit A includes a temperature analyzer to determine whether the temperature of the GPU A exceeds the predetermined temperature threshold TMP THR. The temperature threshold TMP THR is an example of a predetermined temperature threshold level. Upon determining that the temperature of the GPU A exceeds the predetermined temperature threshold, the processing unit A generates the QAS signal and sends the QAS signal to the shader parameter adjuster A. Upon receiving the QAS, the shader parameter adjuster A adjusts values of the one or more parameters P1-P3 of one or more of the image frames 102A-102C in the manner described herein and provides the adjusted values via the communication medium A to the shader A. Upon receiving the adjusted values, the shader A generates one or more frames having the adjusted values of one or more of the parameters P1-P3. On the other hand, upon determining that the temperature of the GPU A does not exceed, e.g., is not greater than, the predetermined temperature threshold, the processing unit A does not generate the QAS signal.

Figure 5:
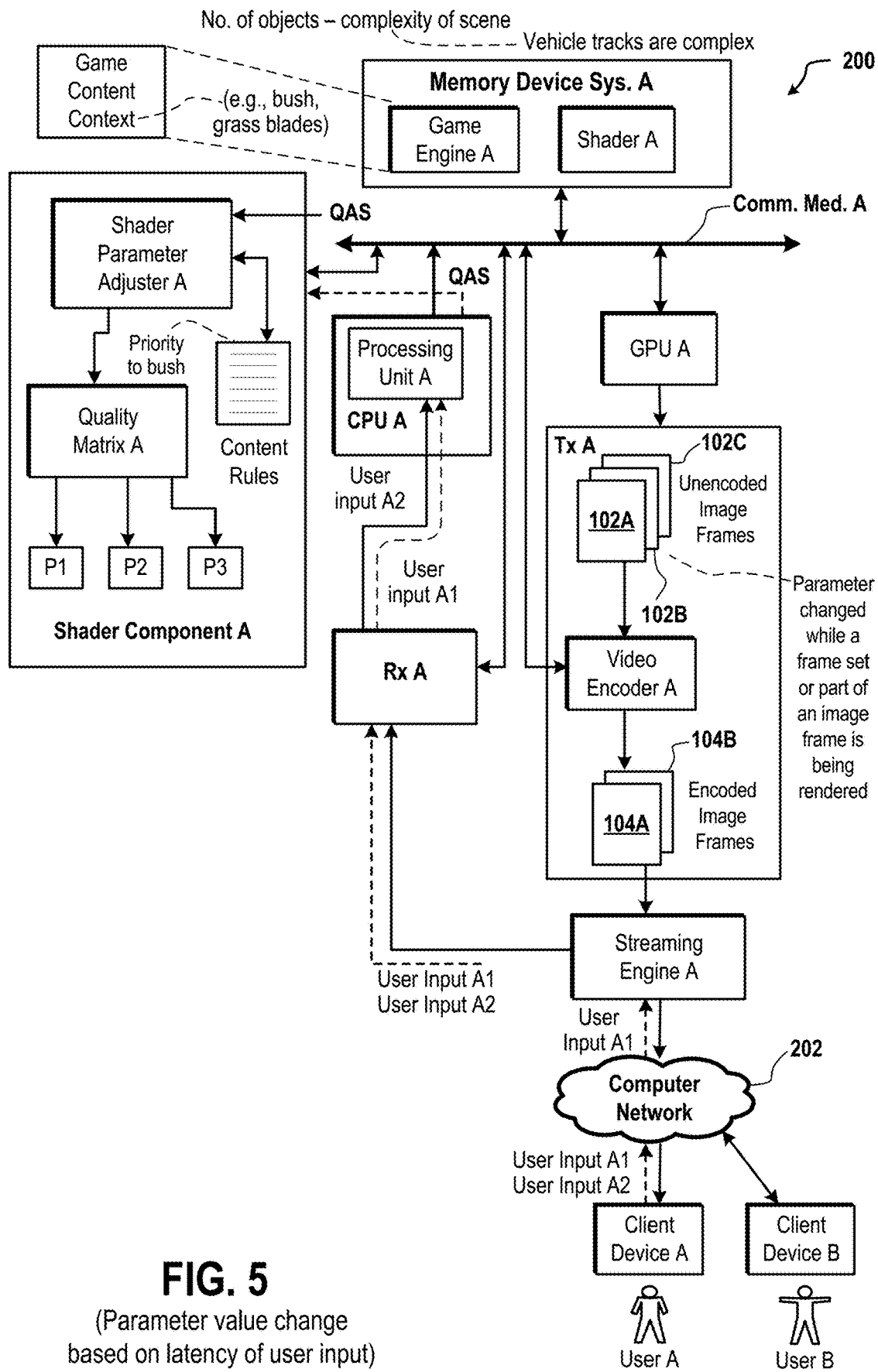
FIG. 5 is a diagram of an embodiment of the system of FIG. 2 to illustrate generation of the QAS signal based on a latency of a user input received from a client device.

FIG. 5 is a diagram of an embodiment of the system 200 to illustrate generation of the QAS signal based on a latency of a user input received from the client device A. The latency of the user input is sometimes referred to herein as user input latency. The user input latency occurs when a user input, such as a user input A2, is received by the CPU A from a client device via the computer network 202 while the GPU A is rendering the image frames 102A-102C.

The user A selects or moves one or more buttons, such as touchscreen buttons or hardware buttons or joysticks of a hand-held controller (HHC), of the client device A and/or performs a motion of a body part of the user A to generate a user input A1. Examples of the body part include a hand, face, fingers, and legs. As an example, the user input A1 indicates that the virtual object in the virtual scene is to move from one position or another or from one orientation to another or jump or duck or bend during execution of the game engine A1. The user input A1 is sent from the client device A via the computer network 202 to the streaming engine A. The streaming engine A sends the user input A1 via the receive unit A to the CPU A. The CPU A executes the game engine A to determine the variables of the virtual object in the virtual scene based on the user input A1. For example, the CPU A determines that the virtual object is to perform a jumping movement upon receiving the user input A1 indicating that the virtual object is to jump. As another example, the CPU A determines that the virtual object is to move from a first position to a second position upon receiving the user input A1 indicating that the virtual object is move from the first position to the second position.

The CPU A sends the variables to the GPU A via the communication medium A. Upon receiving the variables, the GPU A applies the rendering operation to the variables to generate one or more of the image frames 102A-102C. For example, the image frame 102A has the virtual scene. During a time period in which one or more of the image frames 102A-102C are being rendered by the GPU A, the CPU A receives the user input A2 from the client device A via the computer network 202, the streaming engine A, and the receive unit A. The user input A2 is generated by the client device A in response to a selection of the one or more buttons of the client device A by the user A or in response to movement of the body part of the user A. The user input A2 triggers a modification of one or more of the parameters P1-P3 in one or more of the image frames 102A-102C that are being rendered. For example, the user input A2 indicates to the CPU A that one or more additional image frames, other than the image frames 102A-102C, are to be rendered by the GPU A based on the user input A2, and that there is less time to render one or more of the image frames 102A-102C after the user input A2 is received than an amount of time for rendering the one or more of the image frames 102A-102C before the user input A2 is received. To illustrate, the CPU A generates additional values of the variables for the virtual object based on the user input A2. As an example, the CPU A determines additional positions and additional orientations of the virtual object to be rendered in the image frames 102A-102C. The CPU A sends the additional positions and additional orientations via the communication medium A to the GPU A. Upon receiving the additional positions and additional orientations, the GPU A applies the rendering operation to generate the one or more additional image frames. It should be noted that the user input A2 is received by the processing unit A consecutive to receiving the user input A1. For example, no other user input is received between the reception of the user inputs A1 and A2.

In response to receiving the user input A2, the processing unit A sends an inquiry signal to the GPU A via the communication medium A to determine whether the GPU A is generating one or more of the image frames 102A-102C based on the user input A1. Upon receiving the inquiry signal, the GPU A sends a response signal to the processing unit A via the communication medium A indicating that the GPU A has not finished generating one or more of the image frames 102A-102C. For example, the GPU A sends the response signal indicating that the GPU A is still rendering the image frame 102A and is not finished rendering the image frame 102A. Upon receiving the response signal, the processing unit A generates the QAS signal and sends the QAS signal via the communication medium A to the shader parameter adjuster A. Upon receiving the QAS signal, the shader parameter adjuster A modifies value of one or more of the parameters P1-P3 of one or more of the image frames 102A-102C in the manner described herein and provides the modified values via the communication medium A to the shader A. For example the shader parameter adjuster A decreases the level of detail of the virtual object in the virtual scene of the image frame 102A. The shader A renders one or more of the image frames 102A-102C according to the modified values.

In one embodiment, the processing unit A includes a timer to determine the user input latency, such as a time difference between receipt of the user input A2 and receipt of the user input A1 by the processing unit A. Upon determining that the user input latency is less than a predetermined user input latency, such as a predetermined time difference, the processing unit A generates the QAS signal. On the other hand, upon determining that the user input latency is greater than the predetermined user input latency, the processing unit does not generate the QAS signal.

FIG. 6A is a diagram of an embodiment of a table 600 to illustrate examples of the parameters P1, P2, and P3. One example of any of the parameters P1, P2, and P3 is a resolution (R) of at least a portion, such as of the virtual object, within any of the image frames 102A-102C (FIG. 5). To illustrate, the resolution having a value of R1 is lower than the resolution having a value of R2, and the resolution having a value of R2 is lower than a resolution having a value of R3. As an example, the value of R2 refers to a higher pixel count than the value of R1, and the value of R3 refers to a higher pixel count than the value of R2. To further illustrate, the value of R3 refers to an a3×b3 resolution, the value of R2 refers to an a2×b2 resolution, and the value of R1 refers to an a3×b3 resolution, where each of a1, a2, a3, b1, b2, and b3 is an integer. Also, a3 is greater than a2, which is greater than a1, and b3 is greater than b2, which is greater than b1. As used herein, a resolution of the portion of the image frame refers to a number of pixels used to represent the portion in the image frame. For example, resolution refers to a height and width of the portion of the image frame. The resolution R has values ranging from R1 through Rn, where n is an integer greater than 1. A resolution of a portion of an image frame is an example of complexity of the image frame. For example, a decrease in the resolution R of pixels decreases a level of complexity, such as an amount of detail, of a virtual object that is represented by the pixels and an increase in the resolution R increases a level of complexity of the virtual object.

Another example of any of the parameters P1-P3 is a ray iteration count (RIC), which is the number of iterations that are performed to render at least a portion, such as the virtual object, of any of the image frames 102A-102C. To illustrate, a ray iteration count determined by the shader parameter adjuster A to be applied for rendering pixels that represent the virtual object in the virtual scene of the image frame 102A is less than a ray iteration count determined by the shader parameter adjuster A to be applied for rendering pixels of another virtual object in the virtual scene of the image frame 102A. As another illustration, the ray iteration count is number of times for which the color and intensity of the pixels of the virtual object in the image frame 102A is calculated by the shader parameter adjuster A.

The ray iteration count is another example of the complexity of an image frame. For example, a decrease in ray iteration count for rendering a portion of an image frame decreases a level of complexity of the portion and an increase in the ray iteration count increases the level of complexity.

The ray iteration count has values ranging from RIC1 through RICn, where n is an integer greater than 1. It should be noted that RIC1 represents a lower number of ray iteration counts compared to RIC2, which represents a lower number of ray iteration counts compared to RIC3.

Yet another example of any of the parameters P1-P3 is a number of virtual objects rendered (VOR) in any of the image frames 102A-102C. To illustrate, upon receiving the QAS, the shader parameter adjuster A (FIG. 5) applies the content rules (FIG. 5) to render a lower number of virtual objects in the image frame 102A compared to an amount of virtual rejection determined to be rendered in the image frame 102A before receipt of the QAS. To further illustrate, the CPU A (FIG. 5) determines that two virtual objects are to be rendered in the virtual scene of the image frame 102A (FIG. 5). The CPU A sends an instruction to the GPU A via the communication medium A (FIG. 5) to render the two virtual objects. Upon receiving the instruction, the GPU A initiates rendering the two virtual objects. However, when the QAS signal is received, the shader parameter adjuster A applies the content rules (FIG. 5) to determine that instead of the two virtual objects, one of the two virtual objects is to be rendered. The one of the two virtual objects has less or more details compared to the other one of the two virtual objects. The GPU A does not render the other virtual object and renders the virtual object in the virtual scene of the image frame 102A.

The number of virtual objects rendered (VOR) has values ranging from VOR1 through VORn, where n is an integer greater than 1. It should be noted that VOR1 represents a lower number of virtual objects rendered compared to VOR2, which represents a lower number of virtual objects rendered compared to VOR3.

The number of virtual objects rendered in an image frame is yet another example of the complexity of the image frame. For example, a decrease in the number of virtual objects rendered within an image frame decreases a level of complexity of the image frame and an increase in the number of virtual objects increases the level of complexity.

Another example of any of the parameters P1-P3 include a priority (PRTY) in which the virtual objects are to be rendered in any of the image frames 102A-102C. To illustrate, during the rendering operation, the first virtual object in the virtual scene of the image frame 102A is rendered by the GPU A before the second virtual object of the virtual scene of the image frame 102A is rendered by the GPU A. Before the rendering operation, the CPU A indicates to the GPU A that the second virtual object is to be rendered at a location, further away, in the depth dimension, compared to the first virtual object. The second virtual object has the greater depth, such as a greater distance in the depth dimension, compared to a depth of the first virtual object and is rendered after rendering the first virtual object. As yet another illustration, during the rendering operation, the first virtual object in the virtual scene of the image frame 102A is rendered by the GPU A before the second virtual object of the virtual scene of the image frame 102A is rendered by the GPU A. Before the rendering operation, the CPU A indicates to the GPU A that the first virtual object is to be rendered a prominent location within the one or more image frames 102A-102C than a location of the second virtual object in the one or more image frames 102A-102C. A lower amount of distance in the depth dimension of the first virtual object compared to an amount of distance in the depth dimension of the second virtual object is an example of the prominent location of the first virtual object. The lower amount of distance of the first virtual object is sometimes referred to herein as a closer distance and the amount of distance of the second virtual object is sometimes referred to herein as a farther distance. The depth dimension, as an example, is measured along an axis that is perpendicular to a plane of display of the image frame 102A, 102B, or 102C. The plane of display of an image frame is a plane of a display screen on which the image frame is displayed. The priority PRTY in rendering is determined by the shader parameter adjuster A.

The priority in rendering has values ranging from PRTY1 through PRTYn, where n is an integer greater than 1. It should be noted that PRTY1 represents a lower priority in rendering compared to PRTY2, which represents a lower priority in rendering compared to PRTY3. A change in priority in rendering the virtual object in one or more of the image frames 102A-102C is an example of a change in a level of complexity of the one or more image frames 102A-102C.

Yet another example of any of the parameters P1-P3 include a quality parameter (QP), which provides weights to the resolution R, the ray iteration count RIC, the number of virtual objects rendered VOR, and the priority PRTY in rendering applied to the virtual objects in any of image frames 102A-102C. To illustrate, the shader parameter adjuster A applies a weight W1 to the resolution R, a weight W2 to the ray iteration count RIC, a weight W3 to the number of virtual objects rendered VOR, and a weight W4 to the priority PRTY, and sums the weighted resolution, the weighted ray iteration count, the weighted number of virtual objects rendered, and the weighted priority to determine a value of the quality parameter, where each of W1, W2, W3, and W4 is a real number. To further illustrate, the shader parameter adjuster A multiplies the weight W1 with the value of the resolution R, multiplies the weight W2 with the value of the ray iteration count RIC, multiplies the weight W3 with the value of the number of virtual objects rendered VOR, and multiplies the weight W4 with the priority PRTY to calculate a value of the quality parameter. The shader parameter adjuster A sends the value of the quality parameter to the GPU A to apply to the image frame 102A, 102B, or 102C during the rendering operation.

The quality parameter QP has values ranging from QP1 through QPn, where n is an integer greater than 1. It should be noted that QP1 represents a lower quality in rendering compared to QP2, which represents a lower quality in rendering compared to QP3.

Figure 6B:
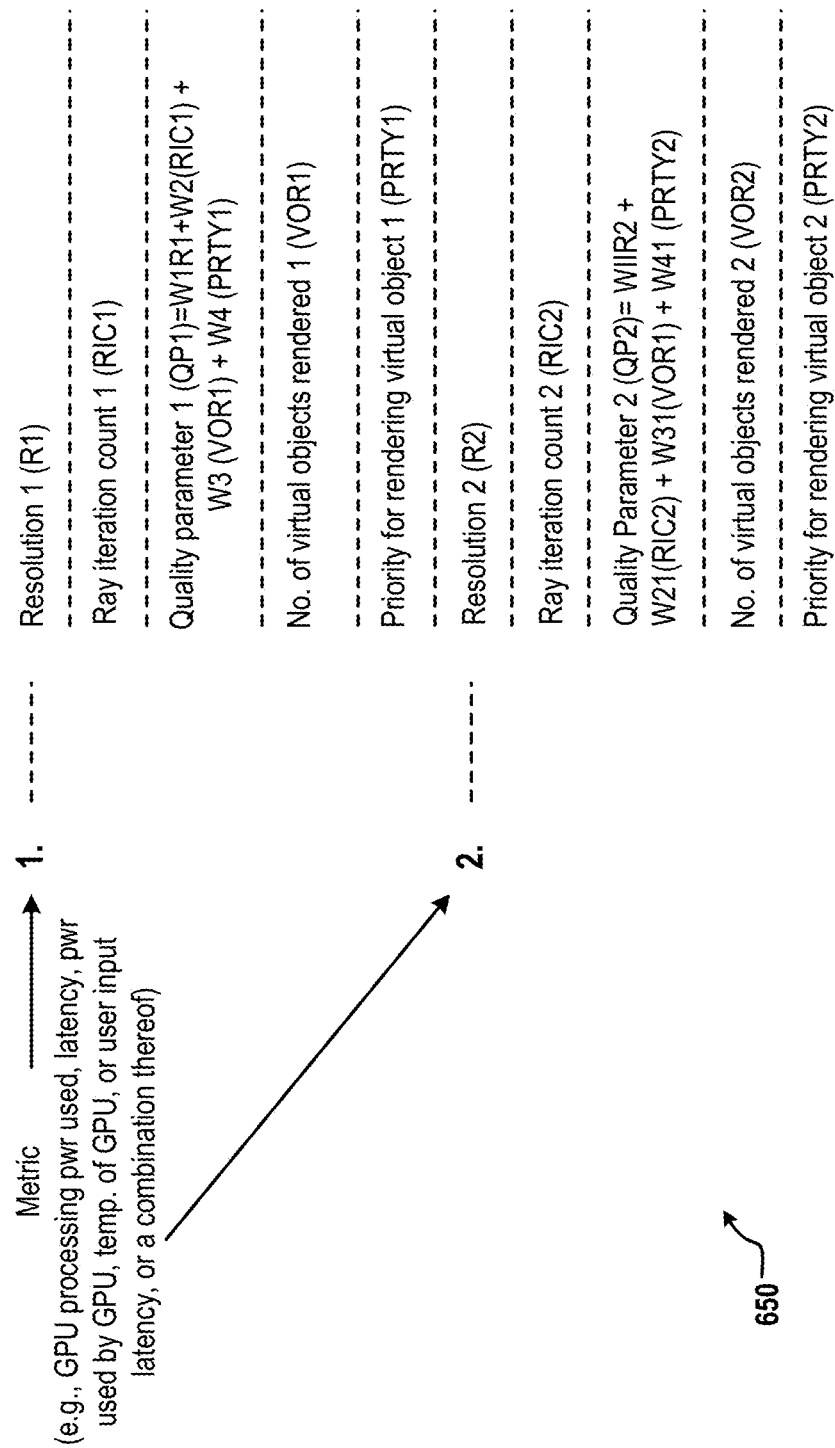
FIG. 6B is a diagram of an embodiment of a mapping between a metric associated with the GPU and one of the parameters.

FIG. 6B is a diagram of an embodiment of a mapping 650 between a metric associated with the GPU A (FIG. 5) and the parameter P1, P2, or P3. The mapping 650 is applied by the shader parameter adjuster A (FIG. 5) to determine a value of the parameter P1, P2, or P3. The mapping is an example of the content rules (FIG. 5), which are applied by the shader parameter adjuster A to determine values of one or more of the parameters P1, P2, and P3. Examples of the metric include an amount of power consumed by the GPU A, the network latency, a temperature of the GPU A, the user input latency, or a combination of two or more thereof.

The shader parameter adjuster A receives the QAS, such as a QAS A, from the processing unit A. The QAS A is generated at a time a power consumed by the GPU A has a value PWR1, the network latency has a value NL1, the GPU A has a temperature value temp1, the user input latency has a value UL1, or a combination of two or more thereof. As an example, the user input latency has the value UL1 when the user input A2 (FIG. 5) is received before one or more of the image frames 102A-102C (FIG. 5) are being rendered and have not finished being rendered. Upon receiving the QAS A, the shader parameter adjuster A accesses the mapping 650 from the memory device system A (FIG. 5) to determine that the resolution of at least a portion of the image frame 102A be R1, the ray iteration count for the portion be RTC1, the quality parameter be QP1, the number of virtual objects rendered in the image frame 102A be VOR1, and the priority for the virtual object in the image frame 102A be PRTY1.

Similarly, the shader parameter adjuster A receives the QAS, such as a QAS B, from the processing unit A. The QAS B is generated at a time a power consumed by the GPU A has a value PWR2, the network latency has a value NL2, the GPU A has a temperature value temp2, the user input latency has a value UL2, or a combination of two or more thereof. As an example, the user input latency has the value UL2 when the user input A2 (FIG. 5) is received before one or more of the image frames 102A-102C (FIG. 5) are being rendered and have finished being rendered. Upon receiving the QAS B, the shader parameter adjuster A accesses the mapping 650 from the memory device system A (FIG. 5) to determine that the resolution of at least a portion of the image frame 102A be R2, the ray iteration count for the portion be RTC2, the quality parameter be QP2, the number of virtual objects rendered in the image frame 102A be VOR2, and the priority for the virtual object in the image frame 102A be PRTY2.

Figure 6C:
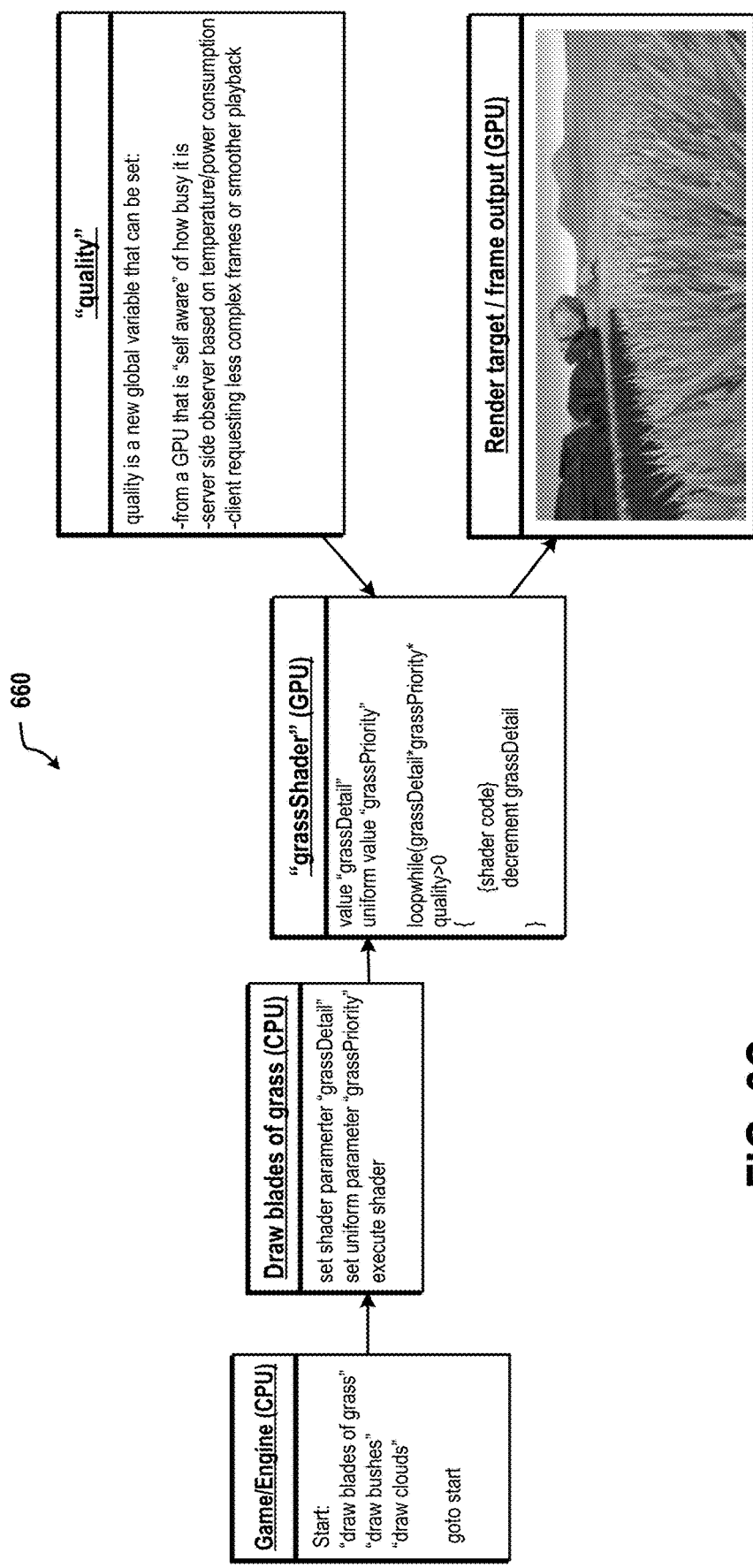
FIG. 6C is a diagram of an embodiment of a method to illustrate that details of a virtual object in an image frame are modified during execution of a rendering operation by the GPU.

FIG. 6C is a diagram of an embodiment of a method 660 to illustrate that details of the virtual object in the image frame 102A (FIG. 5) are modified during execution of the rendering operation by the GPU A (FIG. 5). In the method

660, the CPU A instructs the GPU A via the communication medium A (FIG. 5) to draw blades of virtual grass, draw virtual bushes, and draw virtual clouds within the image frame 102A. The CPU A further sets details of the blades to a value D1 and prioritizes drawing of the blades to the value PRTY1, and provides the details and the priority to the GPU A. The CPU A then instructs the GPU A to execute the shader A (FIG. 5). During execution of the shader A, the GPU A changes a level of detail from D1 to a value D2. The level of detail is a part of the quality parameter, which is modified by the GPU A during execution of the shader A. The quality parameter is adjusted based on how busy the GPU A during execution of the shader A, a temperature of the GPU A during execution of the shader A, an amount of power consumed by the GPU A during execution of the shader A, and whether the user input A2 is received from client device A (FIG. 5) to request less complex image frames or smoother playback of the image frames, such as the image frames 102A-102C (FIG. 5).

It should be noted that in one embodiment, the CPU A does not generate an instruction for the GPU A to change the quality parameter during a time at which the instructions to draw the blades of virtual grass, draw virtual bushes, and draw virtual clouds are generated by the CPU A. For example, the CPU A does not instruct the GPU A to change the quality parameter before the shader A is executed by the GPU A to draw the blades of virtual grass, virtual bushes, and virtual clouds. Rather, during a time period in which the shader A is executed to draw the blades of virtual grass, virtual bushes, and virtual clouds, the network latency, the temperature of the GPU A, the amount of power consumed by the GPU A, or the user input latency, or a combination of two or more thereof, are determined and based on the determination, the quality parameter is adjusted by the GPU A to generate one or more of the image frames 102A-102C.

Figure 6D:
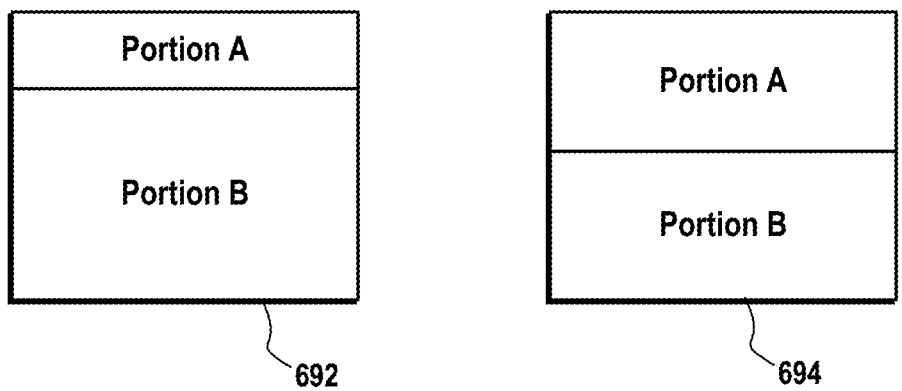
FIG. 6D is a diagram illustrating embodiments of images frames to illustrate that values of one or more of the parameters are adjusted in different portions of the image frames.
Figure 6D:
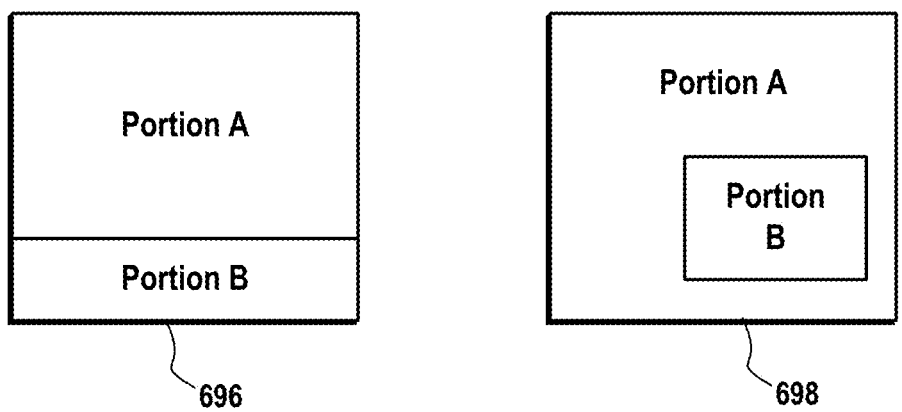
Figure 6D:
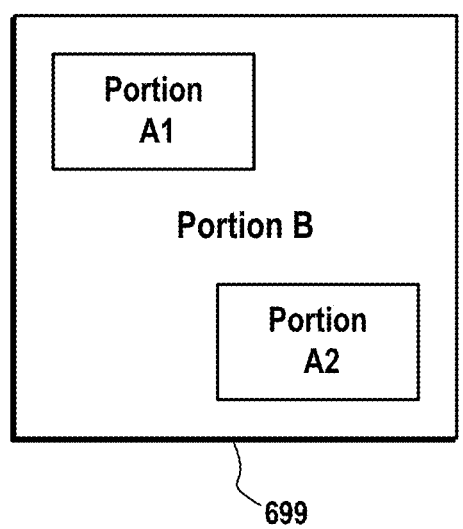

FIG. 6D is a diagram illustrating embodiments of images frames 692, 694, 696, 698, and 699 to illustrate that values of one or more of the parameters P1-P3 are adjusted in different portions of the image frames. Each of the image frames 692, 694, 696, 698, and 699 is an example of any of the image frames 102A-120C (FIG. 5).

Each of the image frames 692-698 has a portion A and a portion B. The portion B has the adjusted values of one or more the parameters P1-P3 and the portion A does not have the adjusted values. As an example, a number of times for which ray tracing is performed for rendering the portion A is greater than a number of times for which ray tracing is performed for rendering the portion B. As an example, the portion A is generated before the portion B is generated by the shader A (FIG. 5). As another example, the portion A is generated after the portion B is generated by the shader A. As yet another example, the portion A is generated simultaneous with generation of the portion B. The portion A in the image frame 692 is above the portion B and has a smaller size than the portion B. The portion A in the image frame 694 is above the portion B and has a size equal to that of the portion B. The portion A in the image frame 696 is above the portion B and has a larger size than the portion B. The portion B in the image frame 698 is surrounded by the portion A and is smaller in size compared to a size of the portion A.

The image frame 699 has multiple portions A1, A2 and B. As an example, the portions A1 and A2 of the image frame 699 are generated by the shader A before the portion B of the image frame 699 is generated by the shader A. As an example, the portions A1 and A2 of the image frame 699 are generated by the shader A after the portion B of the image frame 699 is generated by the shader A. As yet another example, the portions A1 and A2 of the image frame 699 are generated by the shader A simultaneous with generation of the portion B of the image frame 699 by the shader A. The portions A1 and A2 have the adjusted values of one or more of the parameters P1-P3 and the portion B does not have adjusted values of one or more of the parameters P1-P3. As an example, the adjusted values of the portion A1 are different from the adjusted values of the portion A2. As another example, the adjusted values of the portion A1 are the same as, such as equal to, the adjusted values of the portion A2. As yet another example, the adjusted values of the portion A1 are substantially the same as, such as within predetermined ranges from, the adjusted values of the portion A2.

In one embodiment, the portion A is below the portion B in one or more of the image frames 692-694.

In an embodiment, the portion A of the image frames 692-698 has the adjusted values of one or more of the parameters P1, P2, or P3 and the portion B does not have the adjusted values.

In one embodiment, the portion B of the image frame 699 has the adjusted values of one or more of the parameters P1-P3 and the portions A1 and A2 of the image frame 699 do not have adjusted values of one or more of the parameters P1-P3.

Figure 7:
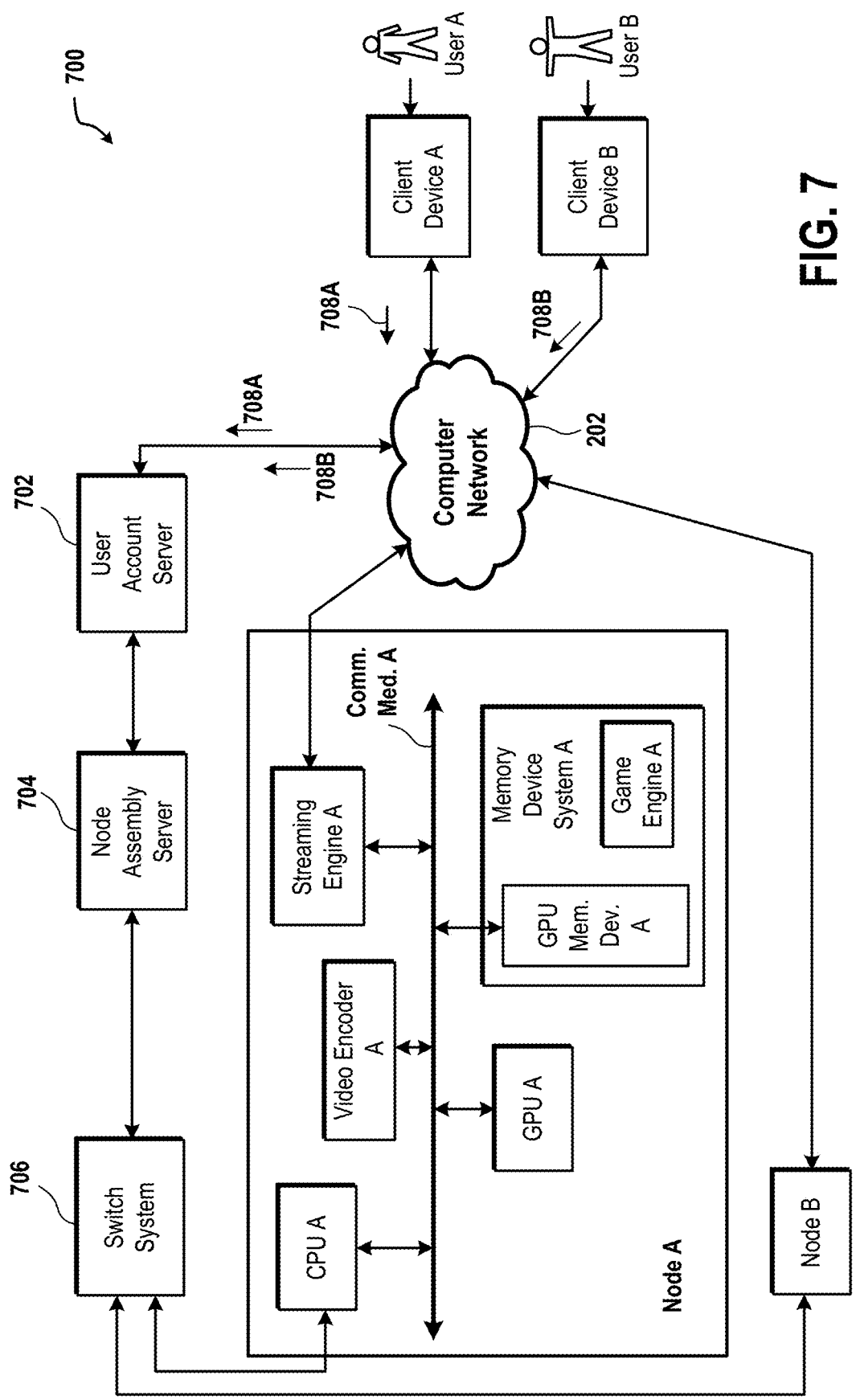
FIG. 7 is a diagram of an embodiment of a system to illustrate use of multiple nodes for gaming

FIG. 7 is a diagram of an embodiment of a system 700 to illustrate use of nodes A and B for distributed gaming The system 100 includes a user account server 702, a node assembly server 704, a switch system 706, nodes A and B, the computer network 202, and the client devices A and B.

A node, as used herein, is a hardware server or a game console that executes the game engine A. As an example, a node has a separate housing than a housing of another node. As another example, a node is placed on a different rack of a data center than a rack on which another node is placed within the data center. In one embodiment, a server, as used herein, includes a processor and a memory device. The processor is coupled to the memory device.

A switch system, as used herein, includes one or more switches that facilitate a transfer of data between the node assembly server 704 and one or more of the nodes A and B. For example, a switch system is a switch fabric. The switch fabric has a large amount of bandwidth among nodes and is dynamically reconfigured often and allows for Quality of Service (QoS). As another example, a switch system includes a multiplexer that selects between the nodes A and B for execution of the game engine A. As another example, a switch system includes one or more transistors that facilitate a transfer of data between the node assembly server 704 and one or both the nodes A and B. As yet another example, a switch system includes one or more switches, each of which changes its position between an open position and a closed position. The open position of a switch decouples the node assembly server 704 from a node that is coupled to the switch. The closed position of the switch couples the node assembly server 704 to a node that is coupled to the switch.

The memory device system A includes a GPU memory device A, which includes a frame buffer for storing the encoded image frames 104A and 104B and a frame buffer for storing the image frames 102A-102C (FIG. 5). The GPU memory device A is coupled to the communication medium A.

Upon receiving login information, such as a username and a password, from the user A via an input device, e.g., a hand-held controller, a camera, etc., of the client device A, the client device A generates a game request 708A and sends the game request 708A with the login information via the computer network 202 to the user account server 702. Similarly, upon receiving login information from the user B via an input device of the client device B, the client device B generates a game request 708B and sends the game request 708B with the login information via the computer network 202 to the user account server 702.

The user account server 702 determines based on the login information received with the game request 708A whether the client device A is authorized to access the game engine A. For example, upon authenticating the login information received with the game request 708A, the user account server 702 determines that the client device A is authorized to access the game engine A. Also, the user account server 702 determines based on the login information received with the game request 708B whether the client device B is authorized to access the game engine A. Upon determining that the user accounts A and B are authorized to access the game engine A, the user account server 702 sends a signal to the node assembly server 704 for enabling execution of the game engine A.

The node assembly server 704 upon receiving the signal from the user account server 702 selects, via the switch system 706, one or both the nodes A and B that will execute the game engine A to initialize the one or both the nodes A and B. For example, the node assembly server 704 sends a signal to a control input of the switch system 706 to couple to one of the nodes A and B. Upon receiving the signal at the control input, the switch system 706 closes a position of one of the switches to connect the node assembly server 704 to the node A and opens a position of another one of its switches to disconnect the node assembly server 704 from the node B.

The game engine A is executed to transfer data, such as encoded frames, from one or both the nodes A and B via the computer network 202 to the client devices A and B. The GPU A is a shared resource when the data, such as encoded frames, is being transferred from the node A to the client devices A and B. The GPU A is shared between the client devices A and B. The user inputs A1 and A2, illustrated above with reference to FIG. 5 are sent from the client device A to the node A after the game request 708A is sent from the client device A to the node A.

Upon receiving the encoded image frames 104A-104B (FIG. 5) via the computer network 202 (FIG. 5), the client device A includes a decoder that decodes, such as decompresses, the encoded image frames 104A and 104B to generate the image frames 102A-102C. A processor, such as a GPU, of the client device A displays the image frame 102A to render the virtual scene of the game, and further displays the image frames 102B and 102C on the display device of the client device A.

It should be noted that in one embodiment, the system 700 includes a number of nodes other than that illustrated in FIG. 7. For example, the system 700 includes 50 nodes, or 25 nodes, or 5 nodes.

Figure 8:
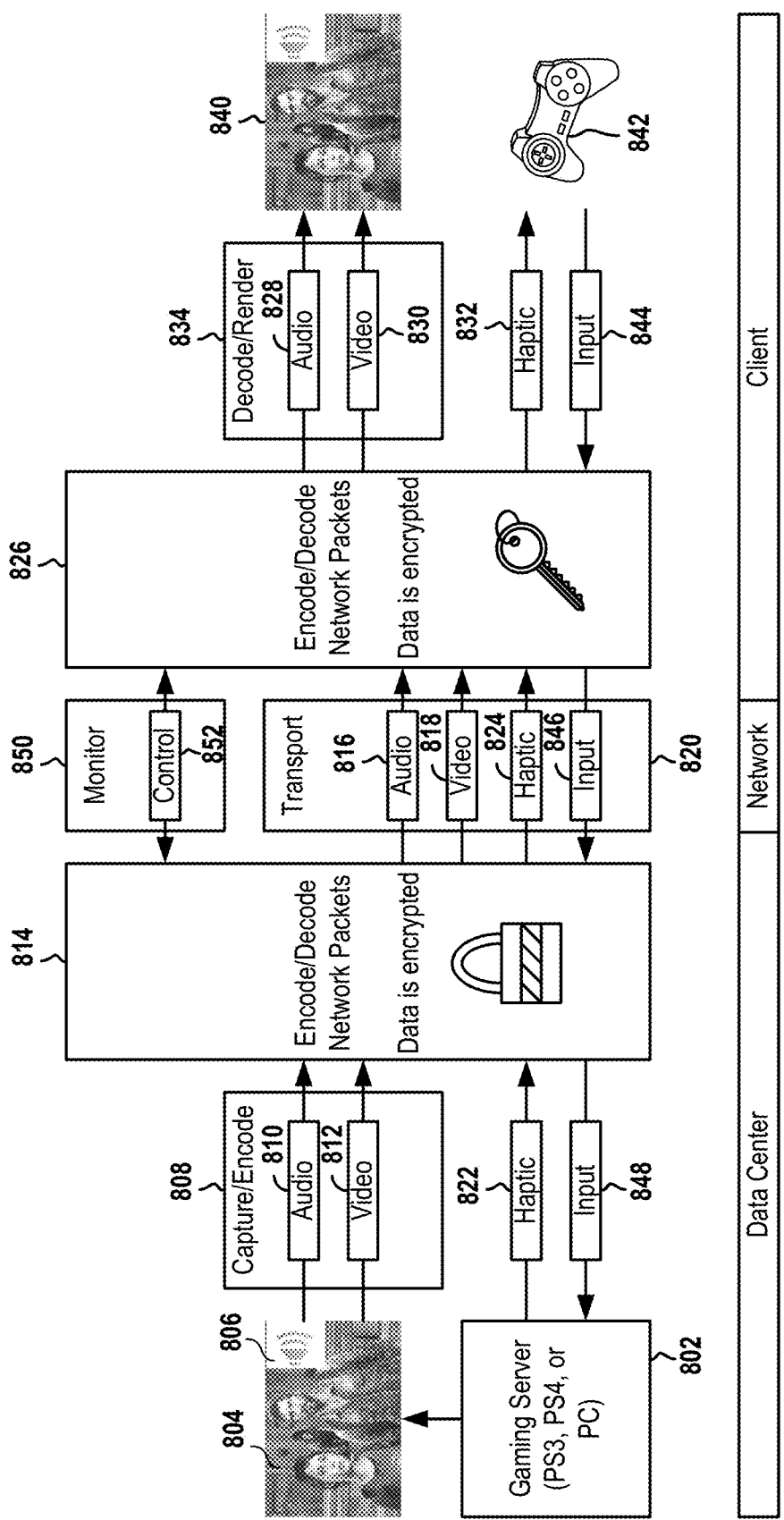
FIG. 8 is an embodiment of a flow diagram conceptually illustrating various operations which are performed for streaming a cloud video game to a client device.

FIG. 8 is an embodiment of a flow diagram conceptually illustrating various operations which are performed for streaming a cloud video game to the client device A or B (FIG. 7). A game server 802, which is an example of the node A or B (FIG. 7), executes a video game and generates raw (uncompressed) video 804 and audio 806. The video 804 and audio 806 are captured and encoded for streaming purposes, as indicated at reference 808 in the illustrated diagram. The encoding provides for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

Encoded audio 810 and encoded video 812 are further packetized into network packets, as indicated at reference numeral 814, for purposes of transmission over the computer network 202 (FIG. 7), such as the Internet. In some embodiments, the network packet encoding process also employs a data encryption process, thereby providing enhanced data security. In the illustrated implementation, audio packets 816 and video packets 818 are generated for transport over a computer network 820, which is an example of the computer network 202.

The game server 802 additionally generates haptic feedback data 822, which is also packetized into network packets for network transmission. In the illustrated implementation, haptic feedback packets 824 are generated for transport over the computer network 820.

The foregoing operations of generating the raw video and audio and the haptic feedback data are performed on the game server 802 of the data center, and the operations of encoding the video and audio, and packetizing the encoded audio/video and haptic feedback data for transport are performed by the streaming engine, such as the streaming engine A, of the data center. As indicated, the audio, video, and haptic feedback packets are transported over the computer network 820. As indicated at reference 826, the audio packets 816, the video packets 818, and the haptic feedback packets 824, are disintegrated, e.g., parsed, etc., by the client device A or B to extract encoded audio 828, encoded video 830, and haptic feedback data 832 at the client device from the network packets. If data has been encrypted, then the data is also decrypted. The encoded audio 828 and encoded video 830 are then decoded by the client device A or B, as indicated at reference 834, to generate client-side raw audio and video data for rendering on a display device 840 of the client device. The haptic feedback data 832 is processed by a processor of the client device, such as the client device A or B, to produce a haptic feedback effect at a controller device 842 or other interface device, e.g., the HMD, etc., through which haptic effects can be rendered. One example of a haptic effect is a vibration or rumble of the controller device 842. The controller device 842 is an example of a hand-held controller that has multiple buttons. The controller device 842 is also a part of the client device A or B. For example, the client device A or B includes the controller device 842 and a game console. As another example, the client device A or B includes the controller device 842 and an HMD. The controller device 842 communicates with the HMD via a wireless protocol, such as Bluetooth™ or Wi-Fi™. As yet another example, the client device A or B includes the controller device 842, a game console, and an HMD. The game console communicates with the HMD via the wireless protocol or via a wired medium, such as a cable, and the controller device 842 communicates with the game console via the wireless protocol or via a wired medium.

It will be appreciated that a video game is responsive to user inputs, such as the user inputs A1 and A2 (FIG. 5), and thus, a similar procedural flow to that described herein for transmission and processing of user input, but in the reverse direction from the client device A or B to the game server 802, is performed. As shown, the controller device 842 or another input device, e.g., a body part of the user A, etc., or a combination thereof generates input data 844, which is an example of any of the user inputs A1 and A2. This input data 844 is packetized at the client device A or B for transport over the computer network 820 to the data center. Input data packets 846 are unpacked and reassembled by the game server 802 to define input data 848 on the data center side. The input data 848 is fed to the game server 802, which processes the input data 848 to update save data for a game state of the video game.

During transport via the computer network 820 of the audio packets 1016, the video packets 818, and haptic feedback packets 824, in some embodiments, the transmission of data over the computer network 820 is monitored to ensure a quality of service. For example, network conditions of the computer network 820 are monitored as indicated by reference 850, including both upstream and downstream network bandwidth, and the game streaming is adjusted in response to changes in available bandwidth. That is, the encoding and decoding of network packets is controlled based on present network conditions, as indicated by reference 852.

Figure 9:
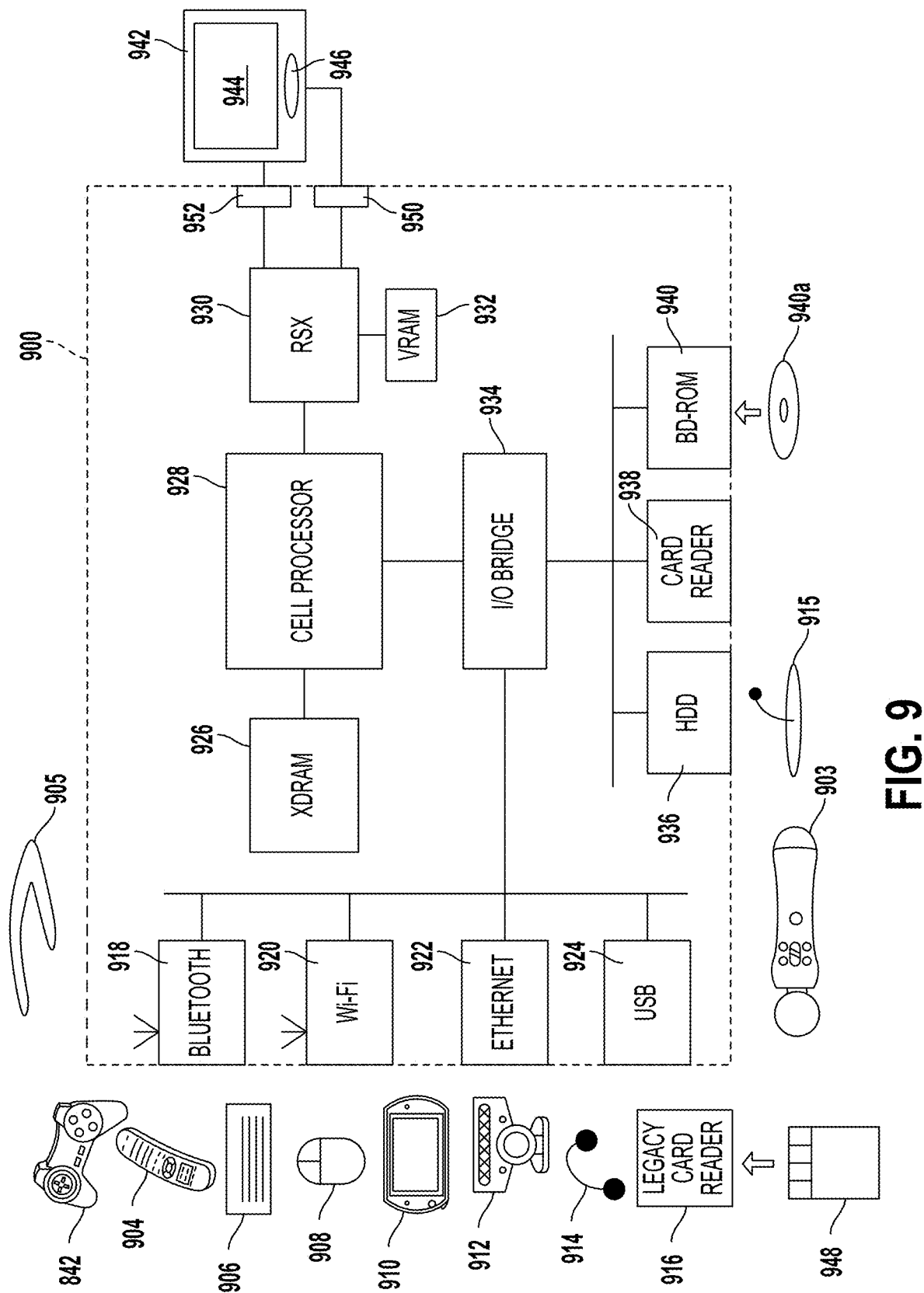
FIG. 9 is a block diagram of an embodiment of a game console that is compatible for interfacing with a display device of the client device and is capable of communicating via a computer network with a game server.

FIG. 9 is a block diagram of an embodiment of a game console 900 that is compatible for interfacing with the display device of the client device A or B and is capable of communicating via the computer network 820 (FIG. 8) with the game server 802 (FIG. 8). The game console 900 is located within the data center or is located at a location at which the user A is located. In some embodiments, the game console 900 is used to execute a game that is displayed on the client device A or B, such as the HMD. The game console 900 is provided with various peripheral devices connectable to the game console 900. The game console 900 has a dynamic random access memory (XDRAM) unit 926, a cell processor 928, a Reality Synthesizer graphics processor unit 930 with a dedicated video random access memory (VRAM) unit 932, and an input/output (I/O) bridge 934. The game console 900 also has a Blu Ray® Disk read-only memory (BD-ROM) optical disk reader 940 for reading from a disk 940a and a removable slot-in hard disk drive (HDD) 936, accessible through the I/O bridge 934. Optionally, the game console 900 also includes a memory card reader 938 for reading compact flash memory cards, memory Stick® memory cards and the like, which is similarly accessible through the I/O bridge 934. The I/O bridge 934 also connects to a Bluetooth® wireless link port 918, an IEEE 802.9 b/g wireless network (Wi-Fi™) port 920, a gigabit Ethernet port 922, and Universal Serial Bus (USB) 2.0 ports 924 capable of supporting Bluetooth® connections.

In operation, the I/O bridge 934 handles all wireless, USB and Ethernet data, including data from game controllers 842 and/or 903, and from the HMD 905. For example, when the user A is playing a game generated by execution of a portion of the game engine A, the I/O bridge 934 receives input data from the game controllers 842 and/or 903 and/or from the HMD 905 via a Bluetooth® link and directs the input data to the cell processor 928, which updates a current state, such as the variables, of the game accordingly. As an example, a camera within the HMD 905 captures a gesture of the user A to generate an image representing the gesture. The image is another example of the user input A1 or A2 (FIG. 5). Each game controller 842 and 903 is an example of a hand-held controller.

The wireless, USB and Ethernet ports also provide connectivity for other peripheral devices in addition to game controllers 842 and 903 and the HMD 905, such as, for example, a remote control 904, a keyboard 906, a mouse 908, a portable entertainment device 910, such as, e.g., a Sony Playstation Portable® entertainment device, etc., a video camera 912, such as, e.g., an EyeToy® video camera, etc., a microphone headset 914, and a microphone 915. In some embodiments, such peripheral devices are connected to the game console 900 wirelessly, for example, the portable entertainment device 910 communicates via a Wi-Fi™ ad-hoc connection, whilst the microphone headset 914 communicates via a Bluetooth® link.

The provision of these interfaces means that the game console 900 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 916 is connected to the game console 900 via the USB port 924, enabling the reading of memory cards 948 of a kind used by the game console 900. The game controllers 842 and 903 and the HMD 905 are operable to communicate wirelessly with the game console 900 via the Bluetooth® link 918, or to be connected to the USB port 924, thereby also receiving power by which to charge batteries of the game controller 842 and 903 and the HMD 905. In some embodiments, each of the game controllers 842 and 903 and the HMD 905 includes a memory, a processor, a memory card reader, permanent memory, such as, e.g., flash memory, etc., light emitters such as, e.g., an illuminated spherical section, light emitting diodes (LEDs), or infrared lights, etc., microphone and speaker for ultrasound communications, an acoustic chamber, a digital camera, an internal clock, a recognizable shape, such as, e.g., a spherical section facing the game console 900, and wireless devices using protocols, such as, e.g., Bluetooth®, Wi-Fi™, etc.

The game controller 842 is a controller designed to be used with two hands of the user A, and game controller 903 is a single-hand controller with an attachment. The HMD 905 is designed to fit on top of a head and/or in front of eyes of the user A. In addition to one or more analog joysticks and conventional control buttons, each game controller 842 and 903 is susceptible to three-dimensional location determination. Similarly, the HMD 905 is susceptible to three-dimensional location determination. Consequently, in some embodiments, gestures and movements by the user A of the game controller 842 and 903 and of the HMD 905 are translated as inputs, such as the input signals A1 or A2, to the game engine A (FIG. 5) in addition to or instead of conventional button or joystick commands Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc. Examples of bespoke controllers include a single or several large buttons for a rapid-response quiz game (also not shown).

The remote control 904 is also operable to communicate wirelessly with the game console 900 via the Bluetooth® link 918. The remote control 904 includes controls suitable for the operation of the Blu Ray™ Disk BD-ROM reader 940 and for navigation of disk content.

The Blu Ray™ Disk BD-ROM reader 940 is operable to read CD-ROMs compatible with the game console 900, in addition to conventional pre-recorded and recordable CDs, and so-called Super Audio CDs. The Blu Ray™ Disk BD-ROM reader 940 is also operable to read digital video disk-ROMs (DVD-ROMs) compatible with the game console 900, in addition to conventional pre-recorded and recordable DVDs. The Blu Ray™ Disk BD-ROM reader 940 is further operable to read BD-ROMs compatible with the game console 900, as well as conventional pre-recorded and recordable Blu-Ray Disks.

The game console 900 is operable to supply audio and video, either generated or decoded via the Reality Synthesizer graphics unit 930, through audio connectors 950 and video connectors 952 to a display and sound output device 942, such as, e.g., a monitor or television set, etc., having a display screen 944 and one or more loudspeakers 946, or to supply the audio and video via the Bluetooth® wireless link port 918 to the display device of the HMD 905. The sound output device 942 is an example of the display device of the client device A or B. The audio connectors 950, in various embodiments, include conventional analogue and digital outputs whilst the video connectors 952 variously include component video, S-video, composite video, and one or more High Definition Multimedia Interface (HDMI) outputs. Consequently, video output may be in formats such as phase alternating line (PAL) or National Television System Committee (NTSC), or in 2220p, 1080i or 1080p high definition. Audio processing, e.g., generation, decoding, etc., is performed by the cell processor 908. An operating system of the game console 900 supports Dolby® 5.1 surround sound, Dolby® Theatre Surround (DTS), and the decoding of 7.1 surround sound from Blu-Ray® disks.

In some embodiments, a video camera, e.g., the video camera 912, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 900. An LED indicator of the video camera 912 is arranged to illuminate in response to appropriate control data from the game console 900, for example, to signify adverse lighting conditions, etc. Some embodiments of the video camera 912 variously connect to the game console 900 via a USB, Bluetooth® or Wi-Fi™ communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 900, an appropriate piece of software, such as, a device driver, etc., is provided.

In some embodiments, the aforementioned system devices, including the game console 900, the HHC, and the HMD 905 enable the HMD 905 to display and capture video of an interactive session of a game. The system devices facilitate execution of the game engine A to initiate an interactive session of a game and the interactive session defines interactivity between the user A and the game. The system devices further determine an initial position and orientation of the HHC and/or the HMD 905 operated by the user A. The game console 900 determines the current state of a game based on the interactivity between the user A and the game. The system devices track a position and orientation of the HHC and/or the HMD 905 during an interactive session of the user A with the game. The system devices generate a spectator video stream of the interactive session based on the current state of the game and the tracked position and orientation of the HHC and/or the HMD 905. In some embodiments, the HHC renders the spectator video stream on a display screen of the HHC or the display device of the client device A. In various embodiments, the HMD 905 renders the spectator video stream on a display screen of the HMD 905.

Figure 10:
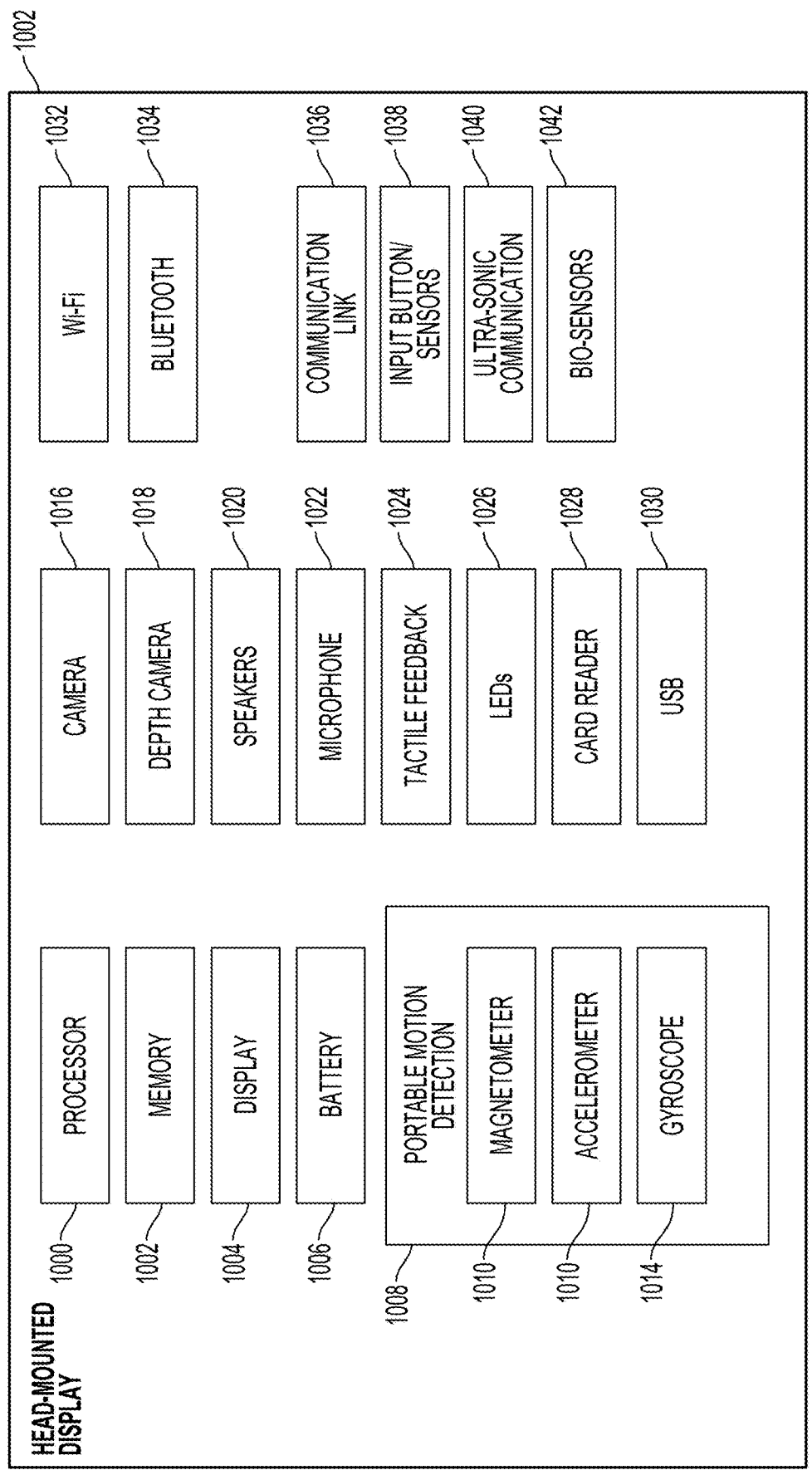
FIG. 10 is a diagram of an embodiment of a head-mounted display (HMD).

With reference to FIG. 10, a diagram illustrating components of an HMD 1002 is shown. The HMD 1002 is an example of the HMD 905 (FIG. 9). The HMD 1002 includes a processor 1000 for executing program instructions. A memory device 1002 is provided for storage purposes. Examples of the memory device 1002 include a volatile memory, a non-volatile memory, or a combination thereof. A display device 1004 is included which provides a visual interface, e.g., display of image frames generated from save data, etc., that the user A (FIG. 1) views. A battery 1006 is provided as a power source for the HMD 1002. A motion detection circuit 1008 includes any of various kinds of motion sensitive hardware, such as a magnetometer 1010, an accelerometer 1012, and a gyroscope 1014.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1012 are used to provide the direction of gravity, which gives an absolute reference for two angles, e.g., world-space pitch and world-space roll, etc.

A magnetometer measures strength and direction of a magnetic field in a vicinity of the HMD 1002. In some embodiments, three magnetometers 1010 are used within the HMD 1002, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 1014, a camera 1016, etc. In one embodiment, the accelerometer 1012 is used together with magnetometer 1010 to obtain the inclination and azimuth of the HMD 1002.

A gyroscope is a device for measuring or maintaining orientation, based on the principles of angular momentum. In one embodiment, instead of the gyroscope 1014, three gyroscopes provide information about movement across the respective axis (x, y and z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 1016 is provided for capturing images and image streams of a real-world environment, e.g., room, cabin, natural environment, etc., surrounding the user A. In various embodiments, more than one camera is included in the HMD 1002, including a camera that is rear-facing, e.g., directed away from the user A when the user A is viewing the display of the HMD 1002, etc., and a camera that is front-facing, e.g., directed towards the user A when the user A is viewing the display of the HMD 1002, etc. Additionally, in several embodiments, a depth camera 1018 is included in the HMD 1002 for sensing depth information of objects in the real-world environment.

The HMD 1002 includes speakers 1020 for providing audio output. Also, a microphone 1022 is included, in some embodiments, for capturing audio from the real-world environment, including sounds from an ambient environment, and speech made by the user A, etc. The HMD 1002 includes a tactile feedback circuit 1024, e.g., a vibration device, etc., for providing tactile feedback to the user A. In one embodiment, the tactile feedback circuit 1024 is capable of causing movement and/or vibration of the HMD 1002 to provide tactile feedback to the user A.

LEDs 1026 are provided as visual indicators of statuses of the HMD 1002. For example, an LED may indicate battery level, power on, etc. A card reader 1028 is provided to enable the HMD 1002 to read and write information to and from a memory card. A USB interface 1030 is included as one example of an interface for enabling connection of peripheral devices, or connection to other devices, such as other portable devices, computers, etc. In various embodiments of the HMD 1002, any of various kinds of interfaces may be included to enable greater connectivity of the HMD 1002.

A Wi-Fi™ circuit 1032 is included for enabling connection to the Internet via wireless networking technologies. Also, the HMD 1002 includes a Bluetooth™ circuit 1034 for enabling wireless connection to other devices. A communications link 1036 is also included, in some embodiments, for connection to other devices. In one embodiment, the communications link 1036 utilizes infrared transmission for wireless communication. In other embodiments, the communications link 1036 utilizes any of various wireless or wired transmission protocols for communication with other devices.

Input buttons/sensors 1038 are included to provide an input interface for the user A (FIG. 1). Any of various kinds of input interfaces are included, such as buttons, touchpad, joystick, trackball, etc. An ultra-sonic communication circuit 1040 is included, in various embodiments, in the HMD 1002 for facilitating communication with other devices via ultra-sonic technologies.

Bio-sensors 1042 are included to enable detection of physiological data from the user A or B. In one embodiment, the bio-sensors 1042 include one or more dry electrodes for detecting bio-electric signals of the user A or B through the user's skin.

The foregoing components of HMD 1002 have been described as merely exemplary components that may be included in HMD 1002. In various embodiments, the HMD 1002 include or do not include some of the various aforementioned components.

Figure 11:
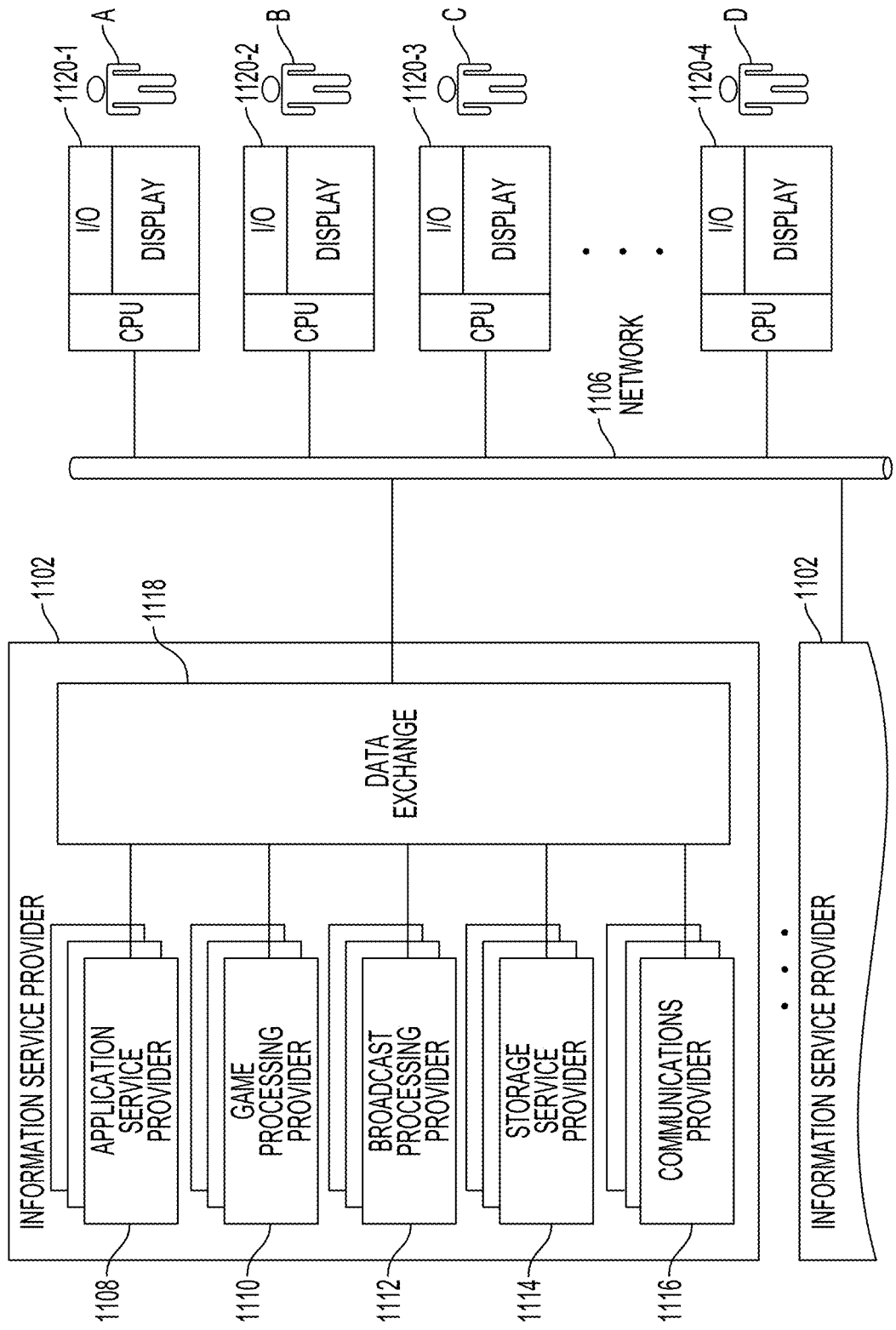
FIG. 11 illustrates an embodiment of an Information Service Provider (INSP) architecture.

FIG. 11 illustrates an embodiment of an Information Service Provider (INSP) architecture. INSPs 1102 delivers a multitude of information services to users A, B, C, and D geographically dispersed and connected via a computer network 1106, e.g., a LAN, a WAN, or a combination thereof, etc. The computer network 1106 is an example of the computer network 820 (FIG. 8). An example of the WAN includes the Internet and an example of the LAN includes an Intranet. The user A operates a client device 1120-1, the user B operates another client device 1120-2, the user C operates yet another client device 1120-3, and the user D operates another client device 1120-4.

In some embodiments, each client device 1120-1, 1120-2, 1120-3, and 1120-4 includes a central processing unit (CPU), a display, and an input/output (I/O) interface. Examples of each client device 1120-1, 1120-2, 1120-3, and 1120-4 include a personal computer (PC), a mobile phone, a netbook, a tablet, a gaming system, a personal digital assistant (PDA), the game console 900 (FIG. 9) and a display device, the HMD 1202 (FIG. 11), the game console 900 and the HMD 1002 (FIG. 10), a desktop computer, a laptop computer, a smart television, etc. Each client device 1120-1, 1120-2, 1120-3, and 1120-4 is an example of the client device A (FIG. 7) or client device B (FIG. 7). In some embodiments, the INSP 1102 recognizes a type of a client device and adjusts a communication method employed.

In some embodiments, an INSP delivers one type of service, such as stock price updates, or a variety of services such as broadcast media, news, sports, gaming, etc. Additionally, the services offered by each INSP are dynamic, that is, services can be added or taken away at any point in time. Thus, an INSP providing a particular type of service to a particular individual can change over time. For example, the client device 1120-1 is served by an INSP in near proximity to the client device 1120-1 while the client device 1120-1 is in a home town of the user A, and client device 1120-1 is served by a different INSP when the user A travels to a different city. The home-town INSP will transfer requested information and data to the new INSP, such that the information "follows" the client device 1120-1 to the new city making the data closer to the client device 1120-1 and easier to access. In various embodiments, a master-server relationship is established between a master INSP, which manages the information for the client device 1120-1, and a server INSP that interfaces directly with the client device 1120-1 under control from the master INSP. In some embodiments, data is transferred from one ISP to another ISP as the client device 1120-1 moves around the world to make the INSP in better position to service client device 1120-1 be the one that delivers these services.

The INSP 1102 includes an Application Service Provider (ASP) 1108, which provides computer-based services to customers over the computer network 1106. Software offered using an ASP model is also sometimes called on-demand software or software as a service (SaaS). A simple form of providing access to a computer-based service, e.g., customer relationship management, etc., is by using a standard protocol, e.g., a hypertext transfer protocol (HTTP), etc. The application software resides on a vendor's server and is accessed by each client device 1120-1, 1120-2, 1120-3, and 1120-4 through a web browser using a hypertext markup language (HTML), etc., by a special purpose client software provided by the vendor, and/or other remote interface, e.g., a thin client, etc.

Services delivered over a wide geographical area often use cloud computing. Cloud computing is a style of computing in which dynamically scalable and often virtualized resources are provided as a service over the computer network 1106. The users A, B, C, and D do not need to be an expert in the technology infrastructure in the "cloud" that supports them. Cloud computing is divided, in some embodiments, in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the computer network 1106, e.g., using servers, storage and logic, etc., based on how the computer network 1106 is depicted in computer network diagrams and is an abstraction for the complex infrastructure it conceals.

Further, the INSP 1102 includes a game processing provider (GPP) 1110, also sometime referred to herein as a game processing server, which is used by the client devices 1120-1, 1120-2, 1120-3, and 1120-4 to play single and multiplayer video games. Most video games played over the computer network 1106 operate via a connection to a game server. Typically, games use a dedicated server application that collects data from the client devices 1120-1, 1120-2, 1120-3, and 1120-4 and distributes it to other clients that are operated by other users. This is more efficient and effective than a peer-to-peer arrangement, but a separate server is used to host the server application. In some embodiments, the GPP 1110 establishes communication between the client devices 1120-1, 1120-2, 1120-3, and 1120-4, which exchange information without further relying on the centralized GPP 1110.

Dedicated GPPs are servers which run independently of a client. Such servers are usually run on dedicated hardware located in data centers, providing more bandwidth and dedicated processing power. Dedicated servers are a method of hosting game servers for most PC-based multiplayer games. Massively multiplayer online games run on dedicated servers usually hosted by the software company that owns the game title, allowing them to control and update content.

A broadcast processing server (BPS) 1112, sometimes referred to herein as a broadcast processing provider, distributes audio or video signals to an audience. Broadcasting to a very narrow range of audience is sometimes called narrowcasting. A final leg of broadcast distribution is how a signal gets to the client devices 1120-1, 1120-2, 1120-3, and 1120-4, and the signal, in some embodiments, is distributed over the air as with a radio station or a television station to an antenna and receiver, or through a cable television or cable radio or "wireless cable" via the station. The computer network 1106 also brings, in various embodiments, either radio or television signals to the client devices 1120-1, 1120-2, 1120-3, and 1120-4, especially with multicasting allowing the signals and bandwidth to be shared. Historically, broadcasts are delimited, in several embodiments, by a geographic region, e.g., national broadcasts, regional broadcasts, etc. However, with the proliferation of high-speed Internet, broadcasts are not defined by geographies as content can reach almost any country in the world.

A storage service provider (SSP) 1114 provides computer storage space and related management services. The SSP 1114 also offers periodic backup and archiving. By offering storage as a service, the client devices 1120-1, 1120-2, 1120-3, and 1120-4 use more storage compared to when storage is not used as a service. Another major advantage is that the SSP 1114 includes backup services and the client devices 1120-1, 1120-2, 1120-3, and 1120-4 will not lose data if their hard drives fail. Further, a plurality of SSPs, in some embodiments, have total or partial copies of the data received from the client devices 1120-1, 1120-2, 1120-3, and 1120-4, allowing the client devices 1120-1, 1120-2, 1120-3, and 1120-4 to access data in an efficient way independently of where the client devices 1120-1, 1120-2, 1120-3, and 1120-4 are located or of types of the clients. For example, the user A accesses personal files via a home computer, as well as via a mobile phone while the user A is on the move.

A communications provider 1116 provides connectivity to the client devices 1120-1, 1120-2, 1120-3, and 1120-4. One kind of the communications provider 1116 is an Internet service provider (ISP) which offers access to the computer network 1106. The ISP connects the client devices 1120-1, 1120-2, 1120-3, and 1120-4 using a data transmission technology appropriate for delivering Internet Protocol datagrams, such as dial-up, digital subscriber line (DSL), cable modem, fiber, wireless or dedicated high-speed interconnects. The communications provider 1116 also provides, in some embodiments, messaging services, such as e-mail, instant messaging, and short message service (SMS) texting. Another type of a communications Provider is a network service provider (NSP), which sells bandwidth or network access by providing direct backbone access to the computer network 1106. Examples of network service providers include telecommunications companies, data carriers, wireless communications providers, Internet service providers, cable television operators offering high-speed Internet access, etc.

A data exchange 1118 interconnects the several circuits inside INSP 1102 and connects these circuits to the client devices 1120-1, 1120-2, 1120-3, and 1120-4 via computer network 1106. The data exchange 1118 covers, in various embodiments, a small area where all the circuits of INSP 1102 are in close proximity, or covers a large geographic area when the different circuits are geographically dispersed. For example, the data exchange 1102 includes a fast Gigabit Ethernet within a cabinet of a data center, or an intercontinental virtual LAN.

In some embodiments, communication between the nodes A and B and the client devices A and B may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog-to-digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for adjusting complexity of content rendered by a graphical processing unit (GPU), comprising:
   receiving, by a shader of the GPU, an instruction from a central processing unit (CPU) to generate an image frame for a scene of a game;
   generating, by the shader of the GPU, a first render portion of the image frame in response to said receiving the instruction from the CPU;
   during the generation of the first render portion of the image frame and before generation of a second render portion of the image frame, tracking, by the shader, one or more metrics affecting the image frame;
   determining, during the generation of the first render portion of the image frame and before the generation of the second render portion of the image frame, that one or more shader parameters of the second render portion of the image frame are to be modified, wherein the one or more shader parameters of the second render portion of the image frame are determined to be modified based on the one or more metrics; and
   while the second render portion of the image frame is being generated, modifying, by the shader, the one or more shader parameters of the second render portion of the image frame, wherein the one or more shader parameters of the second render portion of the image frame are modified without modifying one or more shader parameters of the first render portion of the image frame, wherein said modifying the one or more shader parameters of the second render portion of the image frame occurs before encoding the image frame, wherein said modifying the one or more shader parameters of the second render portion changes a level of complexity of the image frame being generated by the shader.

2. The method of claim 1, wherein the one or more metrics are tracked to identify an amount of power consumed by the GPU during said generating the first render portion of the image frame, the method further comprising:
   analyzing the amount of power consumed by the GPU during said generating the first render portion of the image frame to determine whether the amount of power exceeds a predetermined threshold level, wherein said modifying the one or more shader parameters of the second render portion occurs upon determining that the amount of power exceeds the predetermined threshold level.

3. The method of claim 1, wherein the one or more shader parameters of the second render portion include a number of times for which ray tracing is performed during said generating the second render portion of the image frame, or a resolution of the second render portion of the image frame during said generating the second render portion of the image frame, or a number of virtual objects that are rendered during said generating the second render portion of the image frame, or an order of priority in which the virtual objects are rendered during said generating the second render portion of the image frame, or a combination of two or more thereof.

4. The method of claim 3, wherein the order of priority is based on distances at which the virtual objects are to be rendered, wherein one of the virtual objects that is to be rendered at a closer distance has a greater priority than another one of the virtual objects that is to be rendered at a farther distance.

5. The method of claim 1, wherein said modifying the one or more shader parameters includes decreasing the level of complexity by:
   decreasing a number of times for which ray tracing is performed during said generating the second render portion of the image frame upon determining that an amount of power consumed by the GPU is greater than a predetermined level; or
   decreasing a resolution of the second render portion of the image frame upon determining that the amount of power consumed by the GPU is greater than the predetermined level; or
   decreasing a number of virtual objects that are rendered within the second render portion of the image frame upon determining that the amount of power consumed by the GPU is greater than the predetermined level; or
   prioritizing rendering of the virtual objects upon determining that the amount of power consumed by the GPU is greater than the predetermined level; or
   a combination of two or more thereof.

6. The method of claim 1, wherein the one or more metrics are tracked to identify an amount of latency of transferring a packet between a node and a client device during said generating the first render portion of the image frame, the method further comprising:

analyzing the amount of latency during said generating the first render portion of the image frame to determine whether the amount of latency exceeds a predetermined threshold level, wherein said modifying the one or more shader parameters of the second render portion occurs when it is determined that the amount of latency exceeds the predetermined threshold level.

7. The method of claim 1, wherein said modifying the one or more shader parameters of the second render portion includes decreasing the level of complexity by:

decreasing a number of times for which ray tracing is performed within the second render portion of the image frame upon determining that an amount of latency of transferring a packet between a node and a client device is greater than a predetermined level; or decreasing a resolution of the second render portion of the image frame upon determining that the amount of latency is greater than the predetermined level; or decreasing a number of virtual objects that are rendered within the second render portion of the image frame upon determining that the amount of latency is greater than the predetermined level; or prioritizing rendering of the virtual objects within the second render portion of the image frame upon determining that the amount of latency is greater than the predetermined level; or a combination of two or more thereof.

8. The method of claim 1, wherein the one or more metrics are tracked to identify an amount of temperature of the GPU during said generating the first render portion of the image frame, the method further comprising:

analyzing the amount of temperature during said generating the first render portion of the image frame to determine whether the amount of temperature exceeds a predetermined threshold level, wherein said modifying the one or more shader parameters of the second render portion occurs when it is determined that the amount of temperature exceeds the predetermined threshold level.

9. The method of claim 1, wherein said modifying the one or more shader parameters of the second render portion includes decreasing the level of complexity by:

decreasing a number of times for which ray tracing is performed within the second render portion of the image frame upon determining that an amount of temperature of the GPU during said generating the first render portion of the image frame is greater than a predetermined level; or decreasing a resolution of the second render portion of the image frame upon determining that the amount of temperature is greater than the predetermined level; or decreasing a number of virtual objects that are rendered within the second render portion of the image frame upon determining that the amount of temperature is greater than the predetermined level; or prioritizing rendering of the virtual objects within the second render portion of the image frame upon determining that the amount of temperature is greater than the predetermined level; or a combination of two or more thereof.

10. The method of claim 1, wherein said modifying the one or more shader parameters includes decreasing the level of complexity by:

decreasing a number of times for which ray tracing is performed within the second render portion of the image frame; or decreasing a resolution of the second render portion of the image frame; or decreasing a number of virtual objects that are rendered within the second render portion of the image frame; or prioritizing rendering of the virtual objects within the second render portion of the image frame; or a combination of two or more thereof.

11. The method of claim 1, wherein the second render portion of the image frame includes a plurality of pixels, wherein each of the pixels is provided color, shading, and texturing during said generating the second render portion of the image frame.

12. The method of claim 1, wherein the one or more metrics are tracked to determine whether a user input is received via a computer network during said generating the first portion of the image frame, the method further comprising:

analyzing the user input to determine whether to modify the one or more shader parameters of the second render portion, wherein said analyzing the user input includes determining whether a next image frame is to be generated based on the user input, wherein said modifying the one or more shader parameters of the second render portion is performed upon determining that the next image frame is to be generated.

13. The method of claim 1, wherein said modifying the one or more shader parameters of the second render portion of the image frame is done in response to a quality adjuster signal (QAS) received from a processor, wherein the GPU is coupled to the processor.

14. The method of claim 1, further comprising:

encoding additional image frames, wherein said encoding the image frame and said encoding the additional image frames is performed to output a plurality of encoded image frames;

sending the plurality of encoded image frames to a client device via a computer network for display of a plurality of images on the client device, wherein the client device is a game console or a smartphone.

15. A server for adjusting complexity of content rendered by a graphical processing unit (GPU), comprising:

the GPU configured to receive an instruction from a central processing unit (CPU) to generate an image frame for a scene of a game, wherein the GPU is configured to execute a shader for generation of a first render portion of the image frame in response to receiving the instruction, wherein the GPU is configured to track one or more metrics during the generation of the first render portion of the image frame and before generation of a second render portion of the image frame, wherein the GPU is configured to determine, during the generation of the first render portion of the image frame and before the generation of the second render portion of the image frame, that one or more shader parameters of the second render portion of the image frame are to be modified, wherein the one or more shader parameters of the second render portion of the image frame are determined to be modified based on the one or more metrics, wherein the GPU is configured to modify the one or more shader parameters of the second render portion of the image frame during the generation of the second render portion of the image frame, wherein the one or more shader parameters of the second render portion of the image frame are modified without modifying one or more shader parameters of the first render portion of the image frame, wherein the one or more shader parameters of the second render portion of the image frame are modified before the image frame is encoded, wherein the modification of the one or more shader parameters of the second render portion changes a level of complexity of the image frame.

16. The server of claim 15, wherein the second render portion of the image frame includes a plurality of pixels, wherein each of the pixels is provided color, shading, and texturing while the second render portion of the image frame is being generated,
wherein while the first render portion of the image frame is being generated, the GPU is configured to:
track the one or more metrics to identify an amount of power consumed by the GPU;
analyze the amount of power consumed by the GPU to determine whether the amount of power exceeds a predetermined threshold level, wherein the GPU is configured to modify the one or more shader parameters of the second render portion upon determining that the amount of power exceeds the predetermined threshold level.

17. The server of claim 15, wherein the one or more shader parameters of the second render portion of the image frame include a number of times for which ray tracing is performed during said generating the second render portion of the image frame, or a resolution of the second render portion of the image frame, or a number of virtual objects that are rendered during said generating the second render portion of the image frame, or an order of priority in which the virtual objects are rendered during said generating the second render portion of the image frame, or a combination of two or more thereof.

18. The server of claim 15, wherein when the second render portion of the image frame is being generated by the GPU, to modify the one or more shader parameters of the second render portion, the GPU is configured to decrease the level of complexity by:
decreasing a number of times for which ray tracing is performed within the second render portion of the image frame; or
decreasing a resolution of the second render portion of the image frame; or
decreasing a number of virtual objects that are rendered within the second render portion of the image frame; or
prioritizing rendering of a plurality of virtual objects within the second render portion of the image frame; or
a combination of two or more thereof.

19. A system for adjusting complexity of content rendered by a graphical processing unit (GPU), comprising:
a central processing unit (CPU); and
the GPU configured to receive an instruction from the CPU to generate an image frame for a scene of a game, wherein the GPU is configured to execute a shader to generate a first render portion of the image frame in response to receiving the instruction, wherein the CPU is configured to track one or more metrics during the generation of the first render portion of the image frame and before generation of a second render portion of the image frame, wherein the CPU is configured to determine, during the generation of the first render portion of the image frame and before the generation of the second render portion of the image frame, that one or more shader parameters of the second render portion of the image frame are to be modified, wherein the one or more shader parameters of the second render portion of the image frame are determined to be modified based on the one or more metrics, wherein the CPU is configured to generate and send a quality adjuster signal (QAS) to the GPU based on the determination that the one or more shader parameters are to be modified, wherein the QAS is sent to the GPU while the first render portion of the image frame is being generated and before the second render portion of the image frame is generated, and
wherein the GPU is configured to modify the one or more shader parameters of the second render portion of the image frame upon receipt of the QAS, wherein the one or more shader parameters of the second render portion of the image frame are modified without modifying one or more shader parameters of the first render portion of the image frame, wherein the one or more shader parameters of the second render portion of the image frame are modified before the image frame is encoded, wherein the modification of the one or more shader parameters of the second render portion changes a level of complexity of the image frame being generated by the GPU.

20. The system of claim 19, wherein the CPU is configured to determine whether a user input is received via a computer network during the generation of the first portion of the image frame, wherein the CPU is configured to analyze the user input to determine whether the QAS is to be generated.

21. The system of claim 19, wherein to modify the one or more shader parameters when the second portion of the image frame is being generated by the GPU, the GPU is configured to decrease the level of complexity by:
decreasing a number of times for which ray tracing is performed for the second render portion of the image frame; or
decreasing a resolution of the second render portion within the image frame; or
decreasing a number of virtual objects that are rendered within the second render portion of the image frame; or
prioritizing rendering of a plurality of virtual objects within the second render portion of the image frame; or
a combination of two or more thereof.

* * * * *